US007394259B2

(12) United States Patent
Fitzgerald

(10) Patent No.: US 7,394,259 B2
(45) Date of Patent: Jul. 1, 2008

(54) METHOD AND SYSTEM FOR DETECTING AND ISOLATING STRAY VOLTAGE

(76) Inventor: Timothy W. Fitzgerald, 238 Birch St., Winneconne, WI (US) 54986

( * ) Notice: Subject to any disclaimer, the term of this patent is extended or adjusted under 35 U.S.C. 154(b) by 0 days.

(21) Appl. No.: 11/469,277

(22) Filed: Aug. 31, 2006

(65) Prior Publication Data
US 2007/0025037 A1 Feb. 1, 2007

Related U.S. Application Data

(63) Continuation-in-part of application No. 11/193,206, filed on Jul. 29, 2005.

(51) Int. Cl.
G01R 31/04 (2006.01)

(52) U.S. Cl. .......................... 324/522; 324/511; 361/78; 361/79

(58) Field of Classification Search ................... 361/78, 361/79; 324/509–512, 522
See application file for complete search history.

(56) References Cited

U.S. PATENT DOCUMENTS

| 4,019,528 | A | 4/1977 | Tyrrell |
| 4,284,210 | A | 8/1981 | Horak |
| 4,367,414 | A | 1/1983 | Miller et al. |
| 4,396,844 | A | 8/1983 | Miller et al. |
| 4,401,055 | A | 8/1983 | Street et al. |
| 4,484,258 | A | 11/1984 | Miller et al. |
| 4,489,385 | A | 12/1984 | Miller et al. |
| 4,511,895 | A | 4/1985 | Miller et al. |
| 4,535,332 | A | 8/1985 | Miller et al. |
| 4,598,286 | A | 7/1986 | Miller et al. |
| 4,735,049 | A | 4/1988 | Ketonen |
| 4,816,956 | A | 3/1989 | Hertz et al. |
| 4,958,250 | A | 9/1990 | Kotski |
| 5,294,023 | A | 3/1994 | Ioannides et al. |
| 5,640,314 | A | 6/1997 | Glasband et al. |
| 5,793,591 | A * | 8/1998 | Summerer et al. ............ 361/86 |
| 5,798,916 | A | 8/1998 | Stacey et al. |

(Continued)

OTHER PUBLICATIONS

Reines, Richard S. and Cook, Mark A., "PSC Staff Report: The Phase II Stray Voltage Testing Protocol," Rural Electric Power Services, Public Service Commission of Wisconsin, Feb. 1999, 23 pages.

(Continued)

Primary Examiner—Vincent Q Nguyen
(74) Attorney, Agent, or Firm—Michael Best & Friedrich LLP

(57) ABSTRACT

A stray voltage detection and isolation system. The stray voltage detection portion of the system includes a water delivery system electrically isolated from an electrical transmission system of an electric utility. Meters measure an electrical characteristic between a first test-point that is electrically connected to the water delivery system and a plurality of second test-points. The second test-points are at earth grounds at locations electrically connected to the first test-point. The location of a source of stray voltage can be determined by evaluating differences in the measured electrical characteristics. The stray voltage isolation portion of the system electrically isolates a water delivery system. A controller maintains an air gap between a water source and a first storage tank or between the first storage tank and a second storage tank. The second storage tank provides the electrically isolated water.

7 Claims, 21 Drawing Sheets

U.S. PATENT DOCUMENTS

| | | | |
|---|---|---|---|
| 5,825,170 | A | 10/1998 | Montreuil |
| 6,396,137 | B1 | 5/2002 | Klughart |
| 6,469,636 | B1 | 10/2002 | Baird et al. |
| 6,690,565 | B2 | 2/2004 | Montreuil |
| 2002/0012286 | A1 | 1/2002 | Ernst et al. |

OTHER PUBLICATIONS http://www.bassengineering.com/SV_Utility_.htm, "Stray Voltage Caused by the Electrical Utility," copyright 1998, last modified on Jan. 7, 2001, pp. 1-3, Bass Associates Inc.

Dahlberg, Duane A., Ph.D., "Ground Currents, an Important Factor in Electromagnetic Exposure," http://www.sncmfg.com/telecom/stray_voltage/dahlberg.html, The Stray Voltage Mitigators, prepared in 1995 and revised Mar. 1999, pp. 1-9, SNC Manufacturing Co., Inc.

Reinemann, Douglas J., Ph.D., Stetson, LaVerne E., Dasho, Daniel M., and Cook, Mark A., "Stray Voltage Update 97," Conference Paper presented at the 1997 Rural Electric Power Conference, Apr. 20-22, 1997, pp. 1-11, sponsored by the Institute of Electrical and Electronics Engineers, Inc., Minneapolis, MN.

"Neutral-to-Ground Voltage Shock Incidents," pp. 1-9, revised May 6, 1993.

http://www.wisconsinpublicservice.com/farm/measuring.asp, "Measuring Stray Voltage on the Farm," pp. 1-2, Wisconsin Public Service Corporation, webpage accessed on Aug. 28, 2006.

"Stray Voltage Detection," A Self-Help Guide, Wisconsin Farm Electric Council, pp. 2-11, Feb. 1997.

Hardie, Chris, "Researchers demonstrate stray voltage measurement techniques," StrayVoltage.org, Special Reports Archive, http://www.strayvoltage.org/stories/index.php3?Story=20010812_researchers.inc, pp. 1-3, Aug. 12, 2001, webpage accessed on Aug. 28, 2006.

"Stray Voltage on Dairy Farms," EEI Transmission & Distribution Conference, Vern Peterson P.E., Minneapolis, MN, Oct. 13, 2004.

La Duca, Sal, "Stray Voltage from Stray Currents," http://www.emfrelief.com/stray.htm, Environmental Assay Inc., copyright 2005, webpage accessed on Mar. 13, 2006.

* cited by examiner

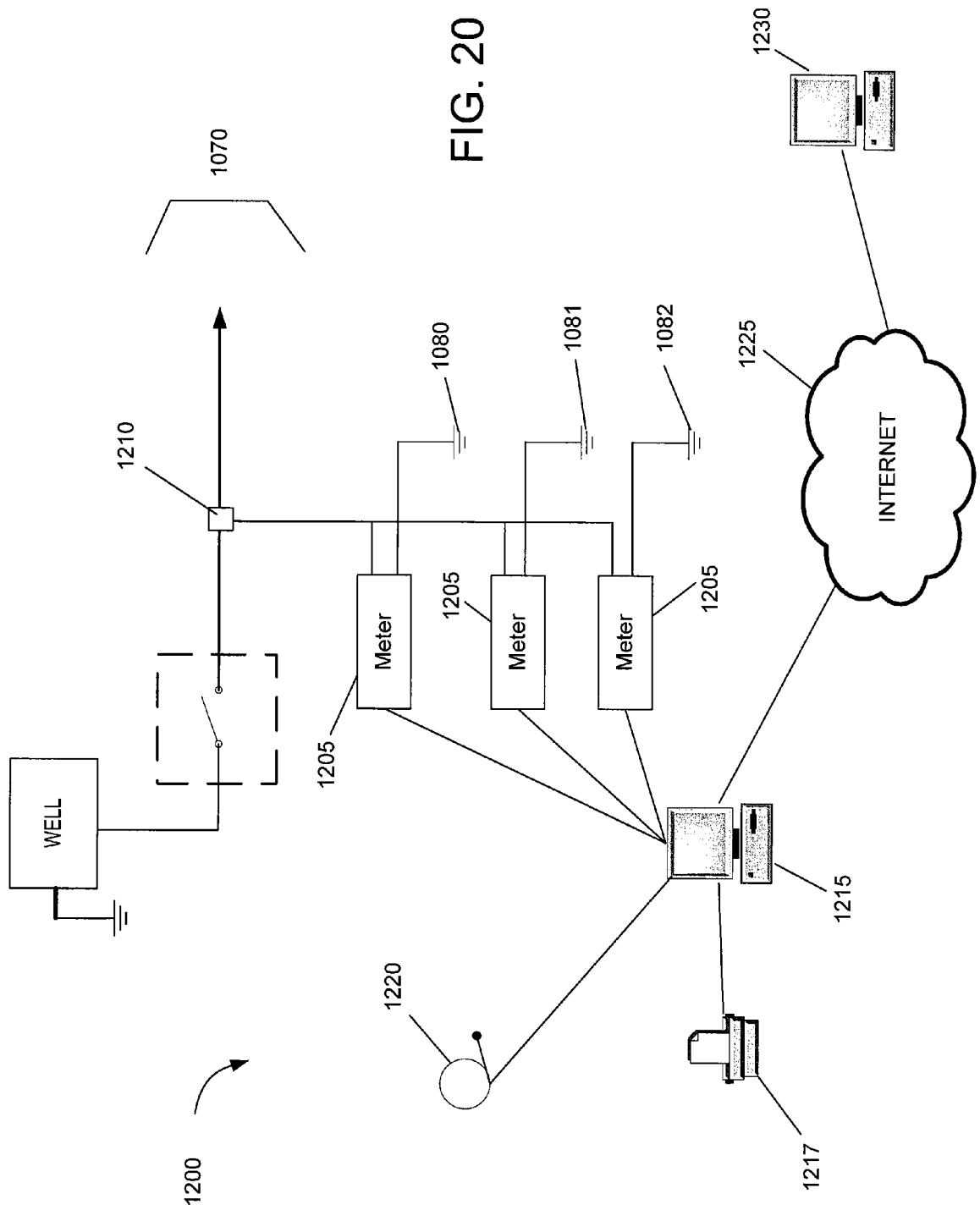

METHOD AND SYSTEM FOR DETECTING AND ISOLATING STRAY VOLTAGE

RELATED APPLICATIONS

This application is a continuation-in-part of U.S. patent application Ser. No. 11/193,206 filed Jul. 29, 2005, the entire contents of which are incorporated herein by reference.

BACKGROUND

Stray voltage is a difference in electrical potential or a voltage that exists outside of an electrical delivery system. One form of stray voltage is neutral-to-earth ("NE") voltage. NE voltage is an electrical potential or voltage between the neutral of an electrical delivery system and an earth ground. NE voltages may be created as a consequence of the architecture of an electric power distribution system. In general, electric power is distributed from a generation site to a number of substations. In one relatively common distribution path, high voltage electricity from a substation is delivered to a line transformer located at a facility that consumes electricity, such as a home, business, or farm. As the distance from the line transformer to the substation increases, an electrical potential between the primary neutral of the line transformer and earth ground increases. The National Electrical Safety Code ("NESC") specifies that utilities connect the neutral on the primary side of a facility's step down transformer to the neutral on the secondary side of the transformer. The purpose of this is to prevent excessively dangerous voltage levels in the event of an open circuit on the primary neutral. However, this recommended connection can cause a situation where the difference in potential of the primary neutral to earth ground is passed to the secondary neutral. The difference in potential can reach a relatively significant level, such as twenty volts.

Another form of stray voltage is an electrical potential that exists between two points susceptible to contact simultaneously by an animal. For example, some electrical distribution systems are designed to utilize the earth as a return path for current to the substation. More specifically, the earth is used as a current return in parallel to the primary neutral. Differences in the impedance of soils may result in differences in electrical potential between two points of earth ground or the earth ground and the electrical system neutral. Thus, it is possible that an animal may simultaneously contact points that have different potentials resulting in current traveling through the animal's body.

The Public Service Commission of Wisconsin has developed a protocol for determining if stray voltage exists on a facility such as a dairy farm. The protocol includes four main tests:

Primary neutral to a remote ground rod voltage
Main service panel neutral to a remote ground rod voltage
Voltage drop in the neutral wire between the primary transformer and the main service panel
Cow contact voltage (obtained by measuring the voltage drop across a 500 ohm resistor shunted between two potential contact points, e.g., a drinking cup and a barn floor)

The tests are conducted for 24 to 48 hours and the results analyzed to determine if stray voltage, or the potential for stray voltage, exists at the facility.

SUMMARY

Stray voltages can have numerous effects including, as noted, causing current to travel through an animal. Although relatively high voltages can cause shocks, stray voltages generally do not reach a level sufficient to cause an electrical shock. Nonetheless, such currents caused by stray voltage can cause discomfort. For example, it is possible for a stray current to travel through a floor of a livestock barn through the body of an animal to reach the metal structure of the barn, and its grounding connection network.

Although stray voltage is known to exist, and at least one protocol exists for detecting it, there are numerous problems surrounding stray voltage that have not been fully addressed. For example, the protocol noted above for detecting stray voltage cannot identify events that occur outside of the testing period nor can they identify all of the potential locations of "cow contact voltage."

In addition, although stray currents may travel through the structure of a building, the inventor has also learned that stray voltage may cause electricity to flow through the plumbing of a water delivery system. When wiring a farm, the National Electrical Code ("NEC") requires that the secondary neutral of the line transformer mentioned above be hard wired to the buildings, the water system, and an electrical ground rod. In addition, NEC and NESC require that all wells be grounded and that secondary neutrals be connected to a building's water system. However, in many areas a certain amount of current will flow to water wells from the primary neutral. Areas that are susceptible to this kind of current include areas where maintenance of power lines is poor, the distance from the utility substation is large, or the conductivity of the soil is poor. In addition, areas that have experienced growth in electrical load and development of wells are also susceptible. Therefore, a water delivery system, that is not electrically isolated from points in the system connected to the secondary neutral, has the ability to cause current to flow through animals that contact earth ground and the water system.

Stray current can cause a variety of affects in animals. For example, the discomfort experienced by an animal may cause it to avoid the area of a building where the current is experienced. If a stray current is caused when drinking from a water delivery system, an animal may avoid drinking or drink less. The affects can vary with the particular species of animal experiencing the stray current. For example, cows are sensitive to very low voltage levels, as low as 0.5 volt. In the presence of stray current, various observations have been made. Some cows refuse to be milked, refuse to enter a barn, or kick a milker. In some situations, it may be possible for a cow to experience mastitis, reproductive problems, and problems associated with somatic cell count.

Similar problems have also been encountered in pigs. In addition, it is believed that stray currents have caused diarrhea, constipation, and an increase in piglet mortality.

Therefore there exists a need to find and eliminate sources of stray currents and to protect animals from incidences of stray current that are not or cannot be eliminated.

One embodiment of the invention provides a liquid delivery system for providing a liquid that is electrically isolated from a liquid source. The liquid delivery system includes a first storage tank, a second storage tank constructed of one or more non-electrically conductive materials, a first inlet valve configured to control a flow of liquid from the liquid source into the first storage tank, a liquid delivery control device configured to control a flow of liquid from the first storage tank into the second storage tank and a control system configured to control the first inlet valve and the liquid delivery control device. The first inlet valve is further configured to create an electrical open between the liquid source and the first storage tank when the first inlet valve is closed. The liquid delivery control device is further configured to create an electrical open between the first storage tank and the second storage tank when the liquid delivery control device is not providing the liquid to the second storage tank. The controller ensures that the first inlet valve is closed when the liquid delivery control device is providing liquid to the second storage tank.

Another embodiment provides a method of delivering a liquid that is electrically isolated from a liquid source to a delivery system. The system includes an inlet valve, a liquid delivery control device, a first storage tank, a second storage tank, and a controller. The method includes providing a liquid from the liquid source to the inlet valve, opening the inlet valve, providing the liquid from the inlet valve to the first storage tank, providing the liquid from a lower portion of the first storage tank to the outlet valve, determining that a level of liquid in the second storage tank is less than a first threshold, closing the inlet valve, maintaining an air gap between the inlet valve and the first storage tank when the inlet valve is closed, operating the liquid delivery control device, providing the liquid from the liquid delivery control device to the second storage tank, determining that the level of liquid in the second storage tank exceeds a second threshold, ceasing operation of the liquid delivery control device, and maintaining an air gap between the liquid delivery control device and the second storage tank when the liquid delivery control device is not operating.

Another embodiment provides a system for detecting and locating a source of unwanted electrical events including a water delivery system electrically isolated from an electrical transmission system of an electric utility, a first test-point electrically connected to the water delivery system and a plurality of locations, a plurality of second test-points, each of the second test points located at an earth ground at one of the plurality of locations, at least one meter, the at least one meter configured to measure an electrical characteristic between the first test-point and one of the second test-points, and a recording device configured to receive and record the measured electrical characteristic from the at least one meter.

Another embodiment provides a method of detecting stray current and determining the source of the stray current at a facility. The facility includes a water delivery system electrically isolated from an electrical transmission system of an electric utility, a first test-point electrically connected to the water delivery system and a plurality of locations, a plurality of second test-points, each of the second test points located at an earth ground at one of the plurality of locations, at least one meter, and a recording device. The method includes measuring an electrical characteristic with the at least one meter between the first test-point and the plurality of second test-points, recording the measured electrical characteristic, charting the electrical characteristic against time, determining an event has occurred, and determining a location where the event occurred.

While the embodiments of the invention described herein relate to animal containment facilities, embodiments could be used in other locations or facilities where there is a desire to electrically isolate a liquid delivery system from its source. Such applications may include hospital water delivery systems, spray painting systems, swimming pools, water parks, machining systems, semiconductor manufacturing, fiberglass manufacturing, and others.

Additional details and additional features and aspects of embodiments of the invention are described below.

BRIEF DESCRIPTION OF THE DRAWINGS

In the drawings:

FIG. 20 is an exemplary illustration of an embodiment of a stray current monitoring system.

DETAILED DESCRIPTION

Figure 1:
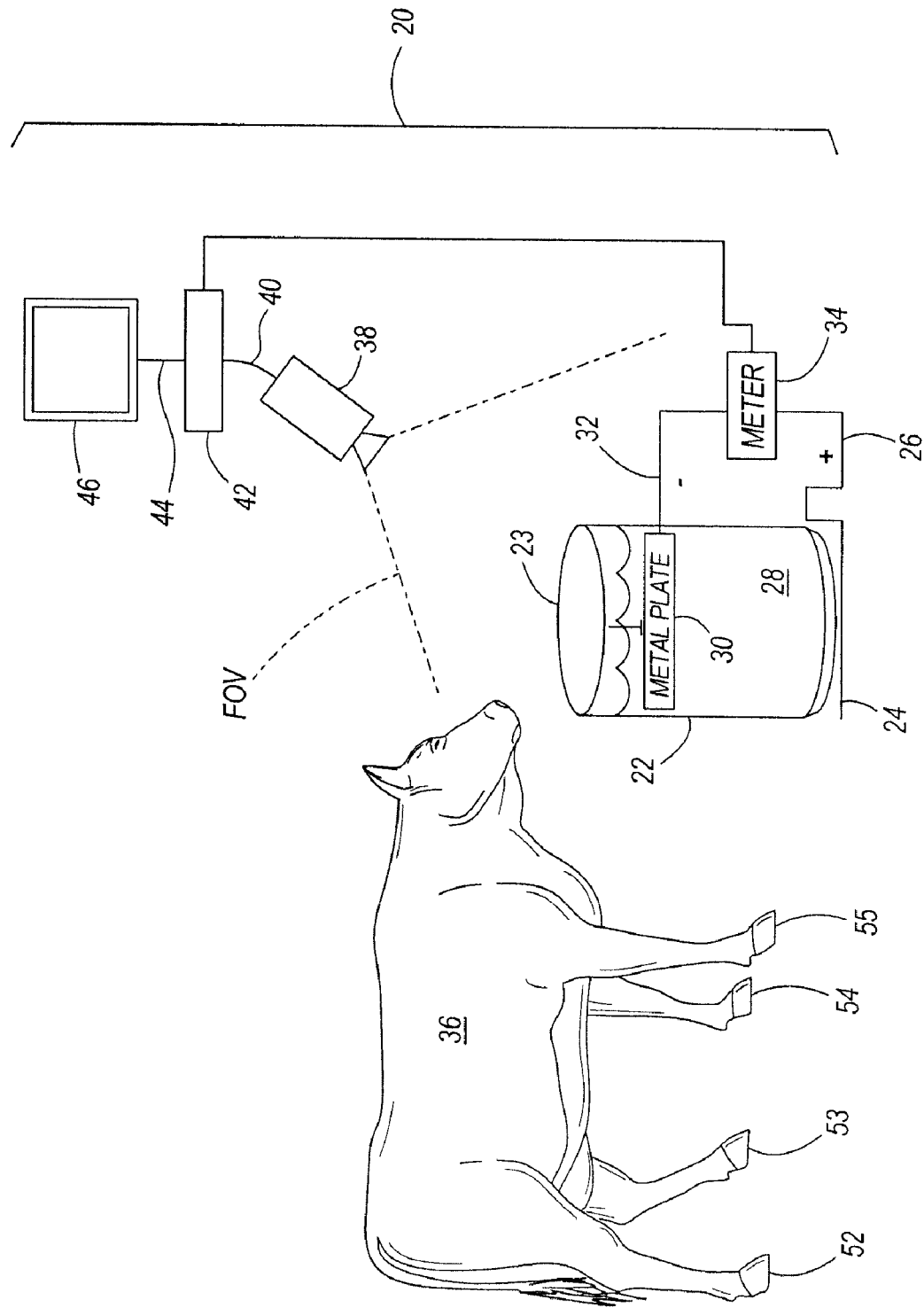
FIG. 1 is an exemplary illustration of a detection device to determine if stray voltage is present in a facility.

Before embodiments of the invention are explained in detail, it is to be understood that the invention is not limited in its application to the details of the examples set forth in the following description or illustrated in the drawings. The invention is capable of other embodiments and of being practiced or carried out in a variety of applications and in various ways.

FIG. 1 shows an embodiment of a detection device 20 to determine if stray voltage is present in a facility. In the embodiment shown, a 25 gallon non-conductive vessel or bucket 22, having a rim 23, sits on a non-galvanic conductive plate 24 (e.g., a one foot square copper plate). The conductive plate 24 has a 14 American wire gauge ("awg") conductive lead 26 attached to it. The bucket is filled with water 28 and a second plate 30 (such as a copper plate or electrode) is suspended below the top surface of the water 28. The second plate 30 may be fixed to a float or other mechanism to maintain the plate 30 a predetermined distance below the surface of the water 28, such as 6". A 14 awg conductive lead 32 is attached to the plate 30. An electrical measuring device or meter 34, such as a direct current ("DC") milliameter, a voltmeter, or an alternating current ("AC") meter, is attached between the two leads 26 and 32 to measure an electrical characteristic, such as current. When an animal 36 drinks from bucket 22, meter 34 measures a chosen electrical characteristic (e.g., current or voltage).

A camera 38 captures an image or images in a field of view ("FOV") that may encompass the bucket 22 and animal 36 and transmits that image via cable 40 to a recording device 42 (e.g., a video cassette recorder). The recording device 42 records the images transmitted by the camera 38. The recording device 42 may deliver the images received from camera 38 via a cable 44 to a display device 46 (e.g., a television) or play back an image previously saved, transmitting a signal of the saved images to the display device 46.

Information from the meter 34 and the camera 38 can be used to determine the presence of stray voltage and the stray current or currents such voltage causes. For example, if a stray voltage is present, animals may avoid drinking from the bucket 22. In addition, the animals may exhibit other signs of discomfort, such as retracting their heads, when first contacting the water in bucket 22. This behavior is captured by the camera 38. Meter 34 may also be placed in the FOV and an image from the meter can be captured by the camera 38. When the meter indicates the presence of a stray voltage or current and discomfort or other behavior is observed in the images recorded by the camera and these phenomena happen at the same time, it can be assumed that an undesirable stray voltage situation exists. Of course, the presence of just one of these phenomena may be sufficient to determine that a stray voltage situation exists.

Other embodiments allow for meter 34 to be coupled directly to recording device 42. Readings from meter 34 could be indicated on, and correlated to, images of the animal's reactions captured by the camera 38.

In still other embodiments, multiple cameras 38 can be configured such that the FOV of each camera 38 captures images of different components of the system (e.g., the meter 34 and the cow 36). The signals from the cameras 38 can then be multiplexed together and simultaneously recorded and/or viewed.

Figure 2:
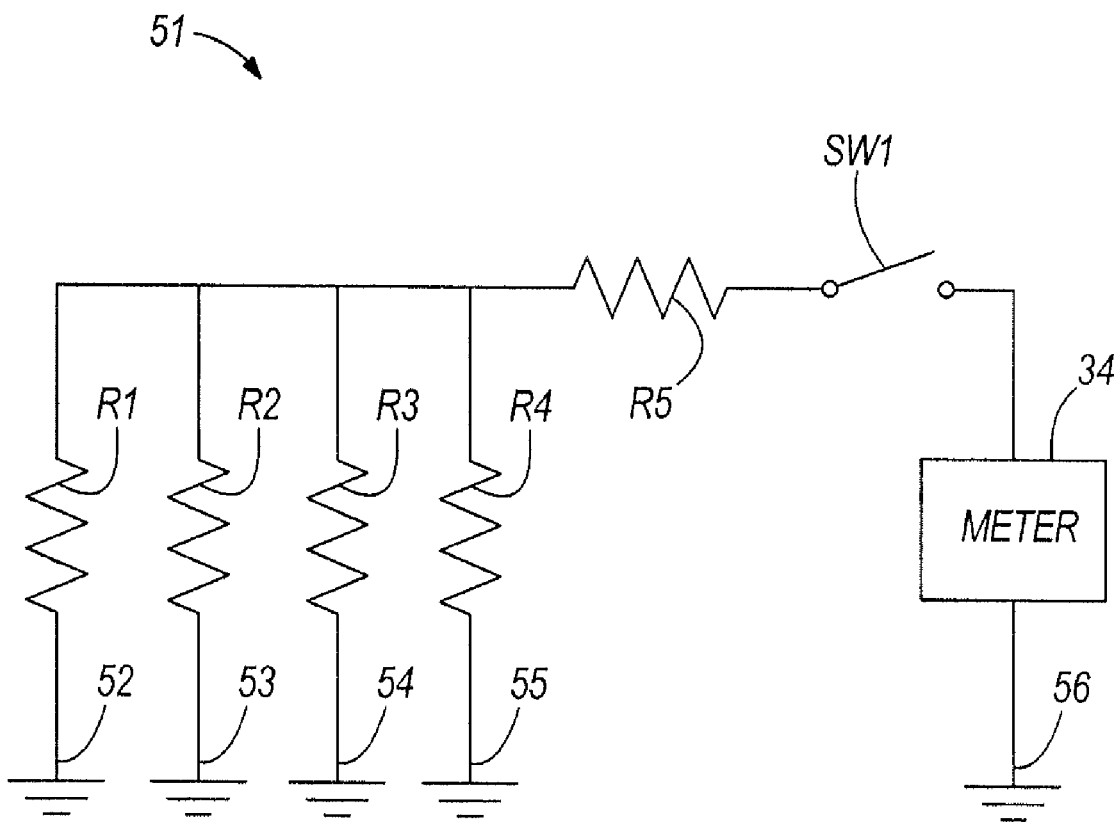
FIG. 2 illustrates a circuit that may be formed by the detection device of FIG. 1.

FIG. 2 illustrates a circuit 51 created by an animal 36 drinking from bucket 22. Resistors 1-4 represent legs of the animal 36. Each leg presents some impedance to electrical current and is represented as a resistor. The animal 36 stands on the ground with all four feet or hooves contacting the ground. Therefore, each resistor, R1-R4, is connected to earth ground. R5 represents the impedance to electrical current supplied by the body of the animal 36. R1-R4, R5, and meter 34 are part of a circuit 51. A switch (SW1) represents the break in the circuit 51 that exists when the animal 36 is not drinking from the bucket 22. When the animal 36 drinks from bucket 22, the circuit 51 is completed, which is represented by closure of the switch (SW1). In the absence of stray voltage, the electrical potential of grounds 52-56 are all the same and no electrical current flows through the circuit 51.

Figure 3A:
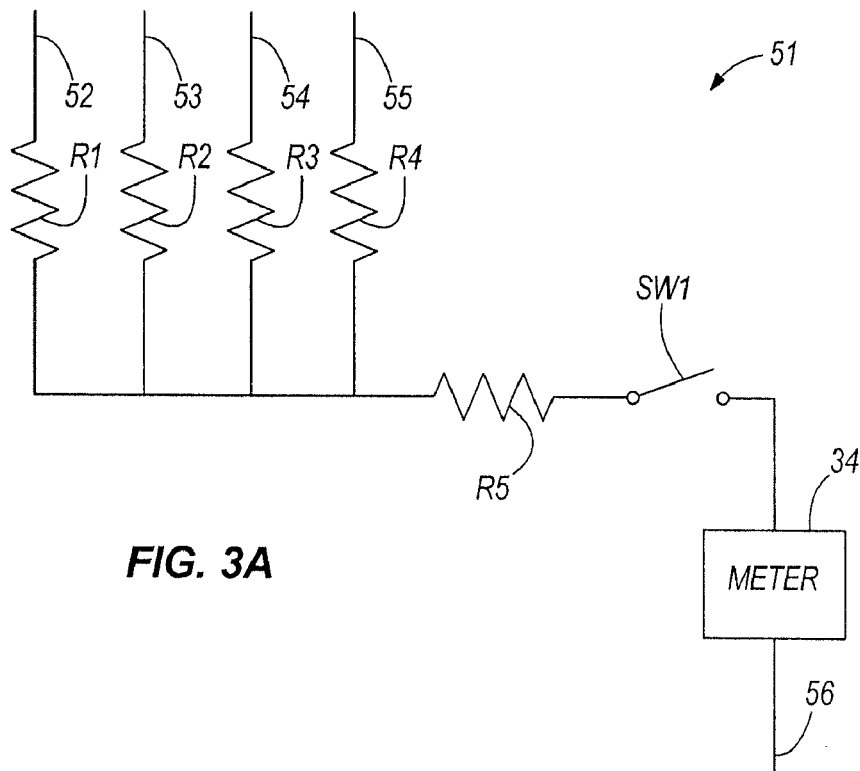
FIG. 3A illustrates another circuit that may be formed by the detection device of FIG. 1.
Figure 3B:
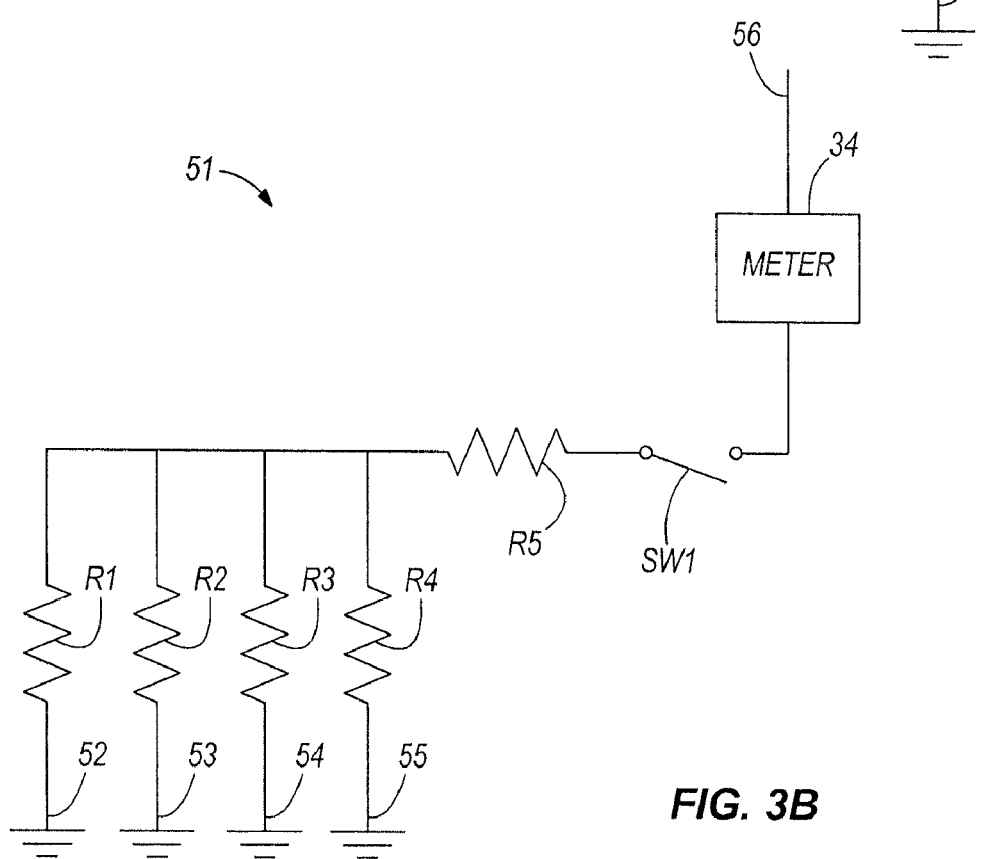
FIG. 3B illustrates another circuit that may be formed by the detection device of FIG. 1.

However, in the presence of stray voltage, an electrical potential between two or more of the earth grounds 52-56 may exist. FIGS. 3A and 3B represent two possible embodiments of stray voltage. In FIG. 3A, animal 36 is in contact with grounds 52-55 that are at a higher electrical potential than ground 56 under bucket 22. When the animal 36 drinks from bucket 22 (which in the model is represented as closing switch SW1), the electrical potential enables electrical current to flow from grounds 52-55 through the animal 36 to ground 55.

In FIG. 3B, animal 36 is in contact with grounds 52-55 that are at a lower electrical potential than ground 56 under bucket 22. When animal 36 drinks from bucket 22, the electrical potential enables electrical current to flow from ground 56 through the animal 36 to grounds 52-55.

Figure 4:
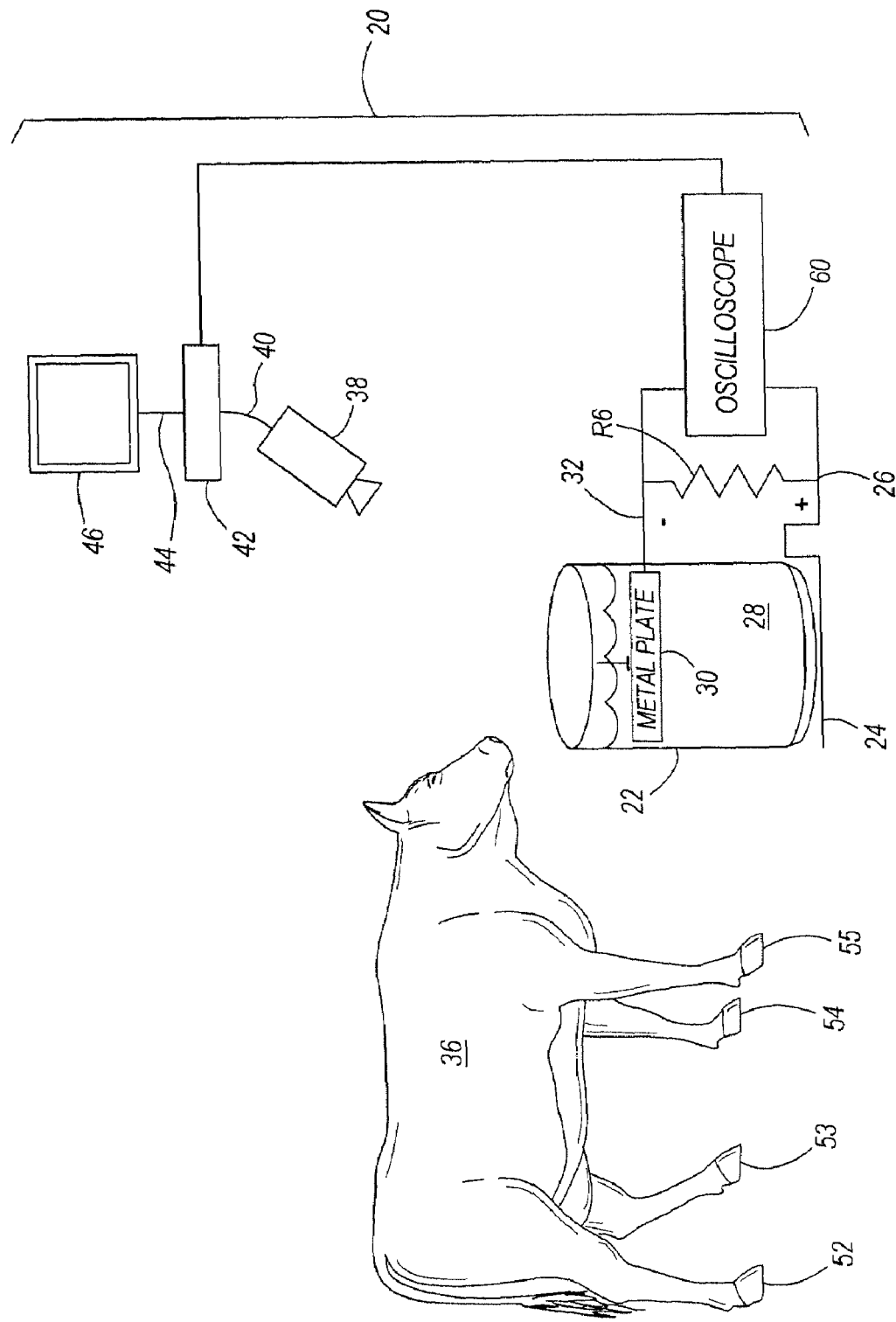
FIG. 4 is an exemplary illustration of a detection device to determine if a time varying stray voltage is present in a facility.

In another embodiment, shown in FIG. 4, detection device 20 determines the presence of stray AC electricity. An optional resistor (R6) may be connected between lead 26 and lead 32. An oscilloscope 60 monitors the voltage across leads 26 and 32. When animal 36 is not drinking from the bucket, an open circuit condition exists. When animal 36 drinks from bucket 22, a closed circuit condition exists. If an electrical potential exists between earth ground 56 and one or more of the four grounds 52-55 under the hooves of animal 36, as illustrated in FIGS. 3A and 3B, the oscilloscope displays a waveform that represents a portion of the potential. If the electrical potential has an AC or time-varying component, the oscilloscope displays a sine wave or other time varying wave of a magnitude indicative of the magnitude of the AC component of the electrical potential. A cow is generally accepted to have a total impedance of approximately 200Ω. Therefore, if animal 36 is a cow, the magnitude of the signal displayed on the oscilloscope will be approximately 70% of the actual electrical potential.

Figure 5A:
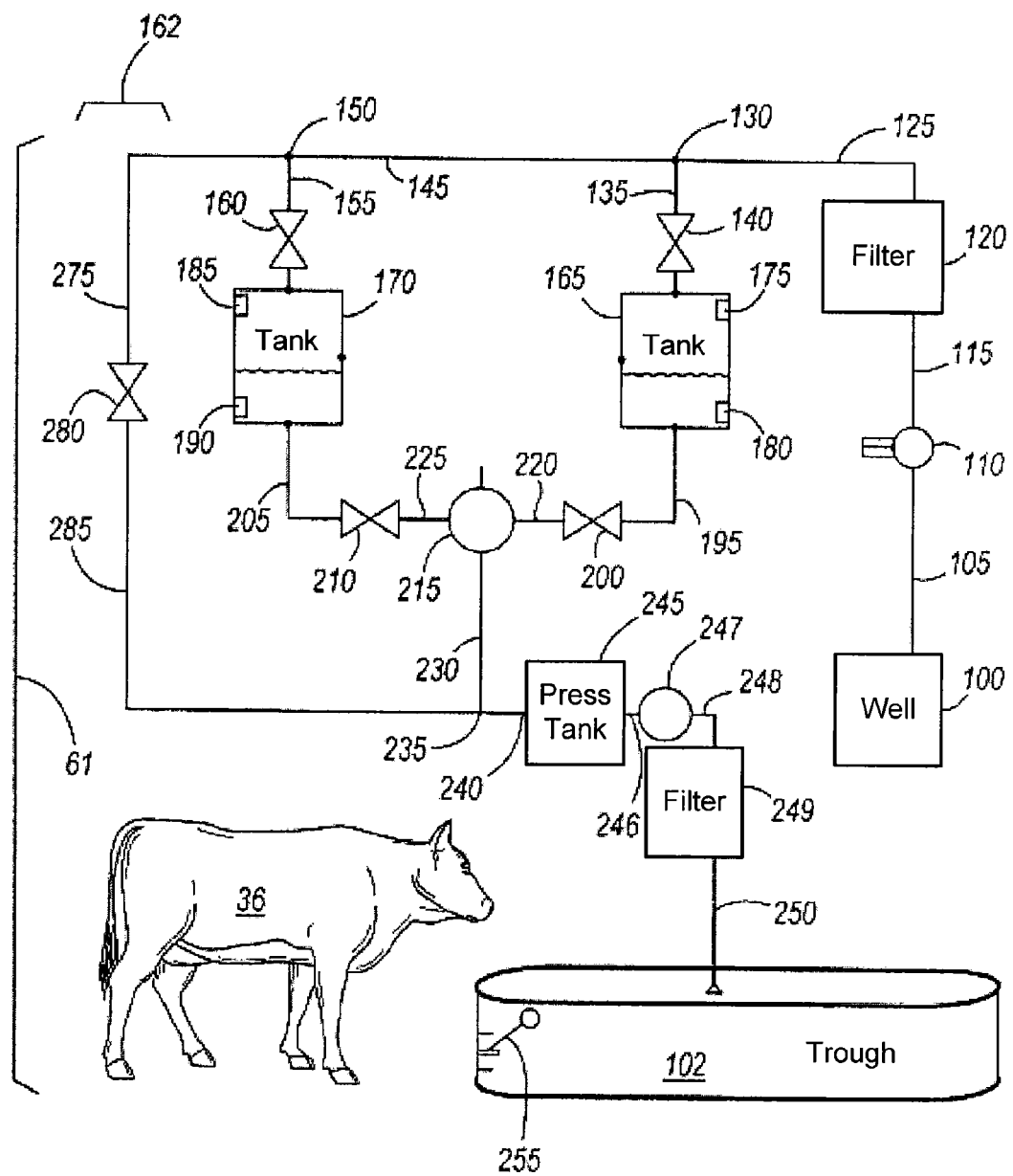
FIG. 5A is an exemplary illustration of a first embodiment of a water delivery system to reduce stray voltage.

FIG. 5A illustrates a water system 61 that is configured to reduce stray voltage affects on animals that drink from it. The system 61 could be implemented, for example, after testing a farm or other facility with the system 20 for the presence of stray voltage or current. The system 61 is configured such that a well 100 is electrically isolated from a portion of a water delivery system that animals can contact such as a water trough 102. Of course, the water could be delivered to a number of troughs or different delivery devices, such as sinks, tubs, and other plumbing fixtures. All electrical conductors (which include any conductive pipes, tanks, etc., that are included in the water delivery system 61) between the grounded well 100, and a secondary neutral of the electrical distribution system (not shown), are electrically isolated from the water trough 102.

The delivery containment devices and the water being supplied from a well 100 are electrically isolated in the system 61. The system 61 includes one or more wells (referred to as well 100) and its associated devices, such as a pump and power supply for the pump (not shown). Well 100 delivers water through pipe 105 which is connected to a pressure switch 110. When pressure above a predetermined threshold is detected by pressure switch 110, the pressure switch 110 opens an internal switch removing power to the pump of well 100.

Water exits the pressure switch 110 through pipe 115 and enters filter 120. The filter removes certain contaminants such as sediment contained in the water. Water then flows through pipe 125 into a Y-fitting or similar device 130 that divides the water into two paths. The first path flows through pipe 135 and into a first valve 140. The second path can flow through pipe 145. An optional Y-fitting or similar device 150 may be connected to the pipe 145 to again divide the water into two paths. The first path flows into a pipe 155 which feeds a second valve 160. The second path flows into an optional, manual bypass system 162. If desired, the bypass system 162 provides a mechanism to ensure the flow of water to the trough 102 in the event of a failure in other parts of the system 61.

When the first valve 140 is opened, water flows into a first storage tank 165. When the second valve 160 is opened, water flows into a second storage tank 170. When the first valve 140 is closed, an air gap exists between the water from the well 100 and water in the first storage tank 165. This air gap acts as an electrical isolator isolating the water in the first storage tank 165 from the well 100. When the second valve 160 is closed, an air gap exists between the water from the well 100 and water in the second storage tank 170. This air gap also acts as an electrical isolator isolating the water in the second storage tank 170 from the well 100.

A first sensor 175 detects when the water has reached a high level in the first storage tank 165. A second sensor 180 detects when the water has reached a low level in the first storage tank 165. A third sensor 185 detects when the water has reached a high level in the second storage tank 170. A fourth sensor 190 detects when the water has reached a low level in the second storage tank 170. Water flows out of the first storage tank 165 via pipe 195 and into a third valve 200. The third valve 200 is constructed from non-conductive materials and is actuated non-electrically (e.g., by air). Water flows out of the second storage tank 170 via pipe 205 and into a fourth valve 210. The valve 210 is constructed from non-conductive materials and is actuated non-electrically (e.g., by air). A booster pump 215 is fed from the third valve 200 via pipe 220 or from the fourth valve 210 via pipe 225.

Because of its construction, the third valve 200 provides an electrical open, when it is closed, that electrically isolates water in the booster pump 215 from water in the first storage tank 165. This provides electrical isolation between the booster pump 215 and the well 100 when the first storage tank 165 is filling and no air gap exists to isolate the first storage tank 165 from the well 100. Similarly, the fourth valve 210, because of its construction, provides an electrical open, when it is closed, that electrically isolates water in the booster pump 215 from water in the second storage tank 170. This provides electrical isolation between the booster pump 215 and the well 100 when the second storage tank 170 is filling and no air gap exists to isolate the second storage tank 170 from the well 100.

Water flows from the booster pump 215 though pipe 230. Pipe 230 is connected to a Y-fitting or similar device 235 which feeds pipe 240. Pipe 240 is connected to a pressure tank 245 which couples to a pipe 246. Pipe 246 feeds a low voltage pressure switch 247. When pressure above a predetermined threshold is detected by pressure switch 247, the pressure switch 247 opens an internal switch removing power to the booster pump 215. Water exits the pressure switch 247 through pipe 248 and enters filter 249 which filters the water and delivers it to pipe 250. Water flows through pipe 250 to trough 102. A float switch 255 resides in trough 102 to indicate when the water level in trough 102 exceeds a predetermined depth.

Figure 5B:
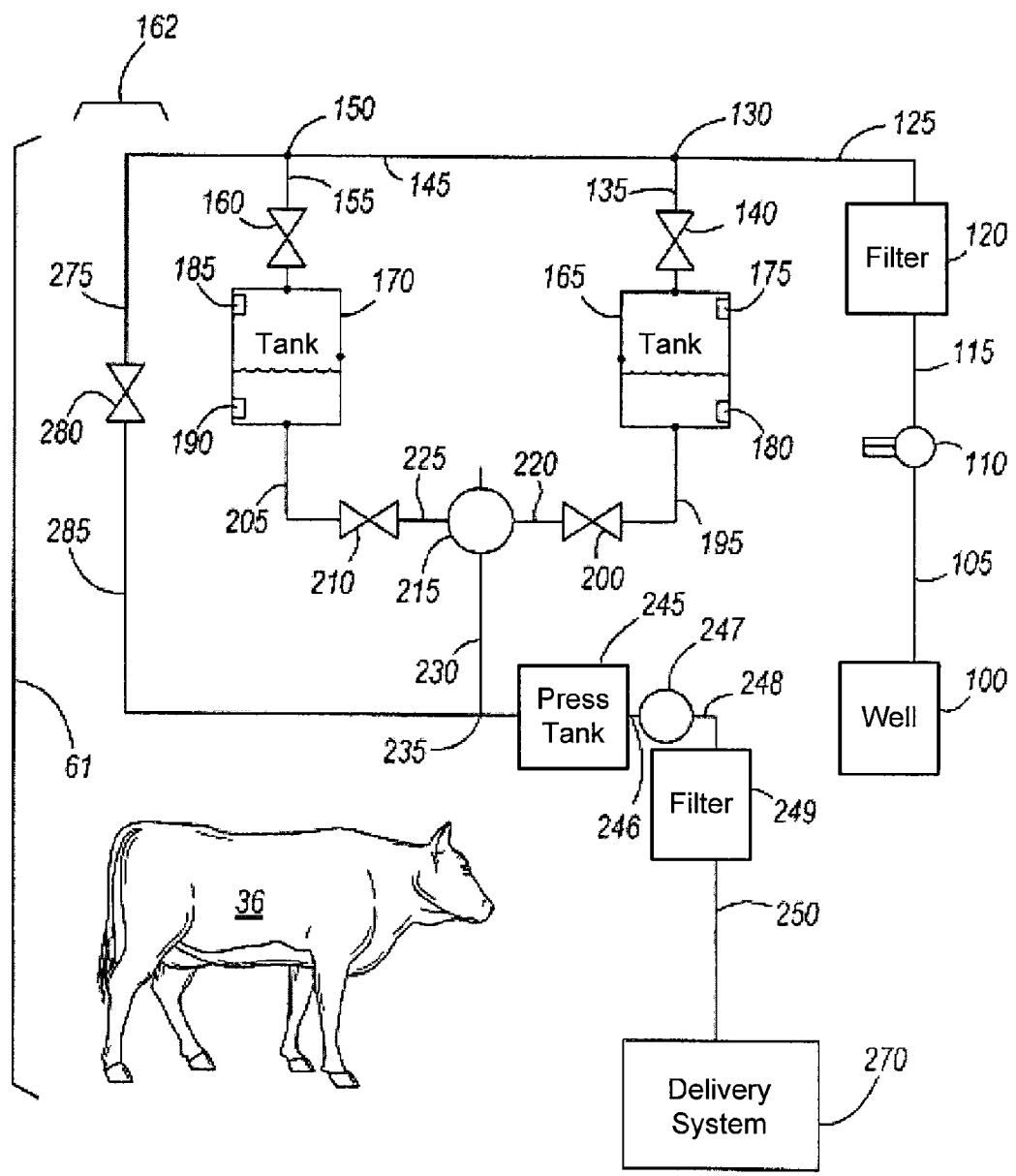
FIG. 5B is an exemplary illustration of a second embodiment of a water delivery system to reduce stray voltage.

An alternative embodiment of the water delivery system 61 is illustrated in FIG. 5B. The system is the same as that shown in FIG. 5A, except water flows from pipe 250 into a pressurized delivery system 270. The low voltage pressure switch 247 detects when the water pressure in the pressurized delivery system 270 drops below a pre-determined threshold.

The manual bypass system 162 (FIGS. 5A and 5B) can be configured to supply water to the trough 102 or the pressurized delivery system 270 in the event the water system 61 is unable to do so. A pipe 275 receives water from Y-fitting 150 and is connected to a manually operated valve 280 which is constructed from non-conductive materials. Valve 280 is connected to pipe 285 which delivers water to Y-fitting 235 and the rest of the system. The use of non-conductive materials in valve 280 maintains the electrical isolation of the water system 61 when the valve 280 is closed.

A section of pipe 125 can be constructed of electrically conductive material (e.g., copper). In the presence of stray voltage on the well 100 system, measuring an electrical characteristic (e.g., voltage) between this conductive section of pipe 125 and ground reflects the level of stray voltage present. Additionally, a section of pipe 240 can be constructed of electrically conductive material (e.g., copper). If the system is operating correctly and electrical isolation between well 100 and the output of water system 61 is achieved, measuring an electrical characteristic (e.g., voltage) between this conductive section of pipe 240 and ground will indicate that stray voltage does not exist at this point in the water delivery system 61, even if such a characteristic exists between the conductive section of pipe 125 and ground.

Certain valves used throughout the water distribution system 61 may be non-electrically-actuated to further isolate the water delivery system 61 from the electrical distribution system. For example, pneumatic or air-actuated valves may be used.

In addition, pipes used throughout the water delivery system 61 may be made of non-conductive materials. Materials suitable for use in the pipes include plastics such as polyvinylchloride ("PVC"), ceramics, and other materials.

Figure 6:
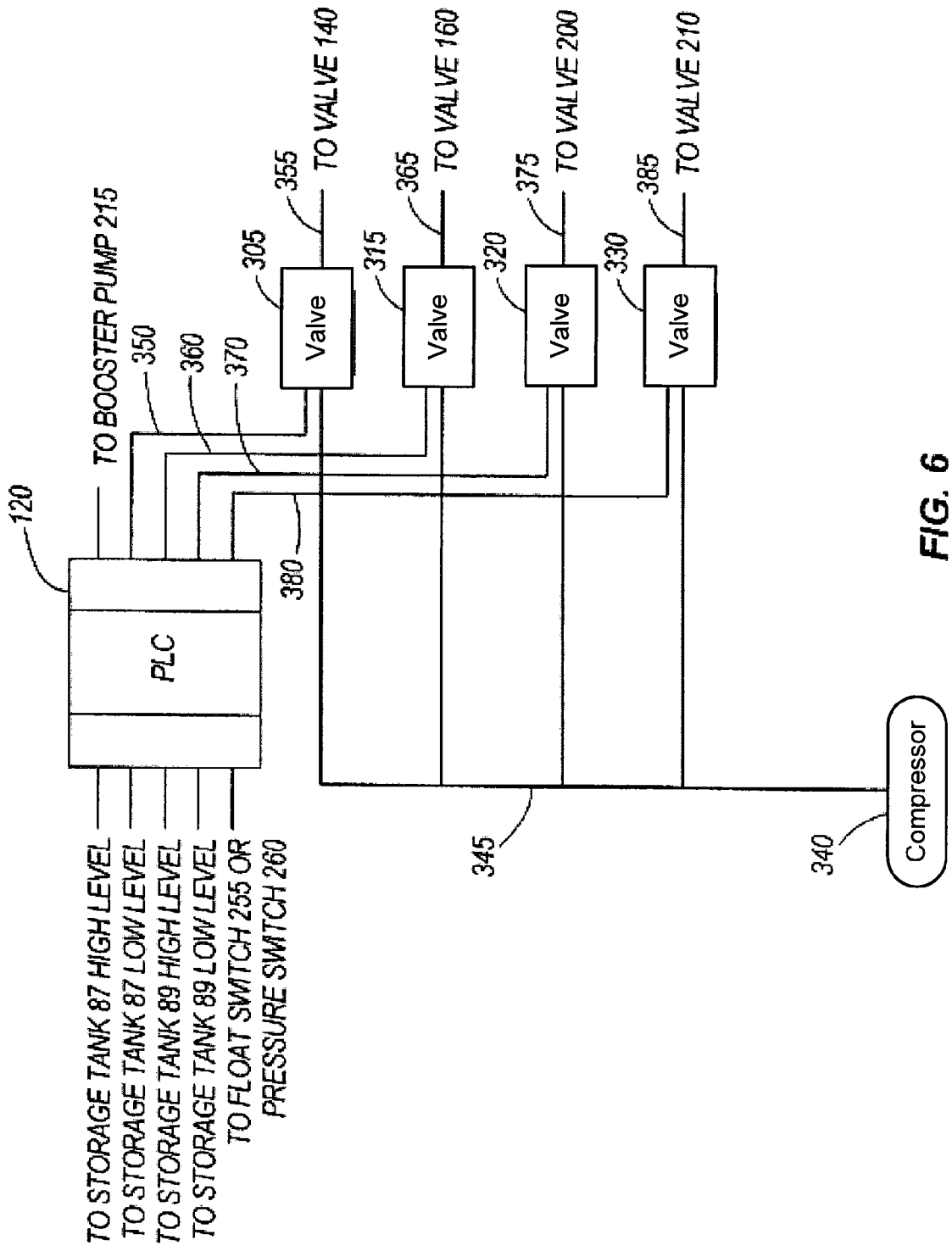
FIG. 6 is an exemplary illustration of a control system for the water delivery system of FIG. 5.

Operation of the water delivery system 61 can be controlled by a programmable logic controller ("PLC") 300 (FIG. 6) such as an Allen-Bradley Micrologix 1200. The PLC 300 receives input signals from the high level indicator 175 for the first storage tank 165. The PLC 300 also receives signals from the low level indicator 180 for first storage tank 165, the high level indicator 185 for second storage tank 170, the low level indicator 190 for second storage tank 170, and float switch 255 (or the low voltage pressure switch 247 in the alternative embodiment of FIG. 5B). Based on the states of the inputs it receives, the PLC 300 determines which devices in the water delivery system 61 to energize and which to de-energize.

Devices controlled by the PLC 300 include the booster pump 215, and a set of valves 305-330 (which in one embodiment are pneumatic valves). The valves 305-330 open and close the valves 140, 160, 200, and 210 (which in one embodiment are also pneumatic valves) of the water delivery system 61. Valves 305-330 are connected to compressor 340 which maintains pressure, such as 40 pounds per square inch ("psi"), in air line 345. The valve 305 is energized by a signal from the PLC 300 delivered from an output 350. When the PLC 300 generates an appropriate signal, the valve 305 opens. This causes air pressure in air line 355 to rise to 40 psi or some other pressure sufficient to activate the valves. The rise in pressure causes valve 140 to open. When valve 305 is de-energized, it closes. When the valve 305 closes, air pressure in air line 355 returns to zero, causing valve 140 to close. When valve 315 is energized, it opens. This causes air pressure in air line 365 to rise (e.g., to 40 psi). The rise in pressure causes valve 160 to open. When pneumatic valve 320 is de-energized it closes, and air pressure in air line 365 returns to zero. Valve 160 then closes. Valve 320 operates in a similar manner.

When valve 320 is energized by the PLC 300, air pressure in air line 375 rises (e.g., to 40 psi). This causes valve 200 to open. When the valve 320 is de-energized, it closes. This causes air pressure in air line 375 to return to zero, causing air-actuated valve 200 to close. Valve 210 operates in a similar manner, opening and closing in accordance with commands received from the PLC and causing changes in air pressure that affect valve 210. Since operation of valves 200 and 210 are similar to the other valves discussed above, additional details are not provided.

The PLC 300 controls various components to create electrical isolation between water being delivered from the booster pump 215 and the well 100. The PLC 300 ensures that an electrical open exists in the water path through the first storage tank 165 by ensuring that valve 140 is closed (creating an air gap) or that valve 200 is closed (isolation created by non-conductive materials). The PLC 300 also ensures that an electrical open exists in the water path through the second storage tank 170 by ensuring that valve 160 is closed (creating an air gap) or that valve 210 is closed (isolation created by non-conductive materials).

Figure 7A:
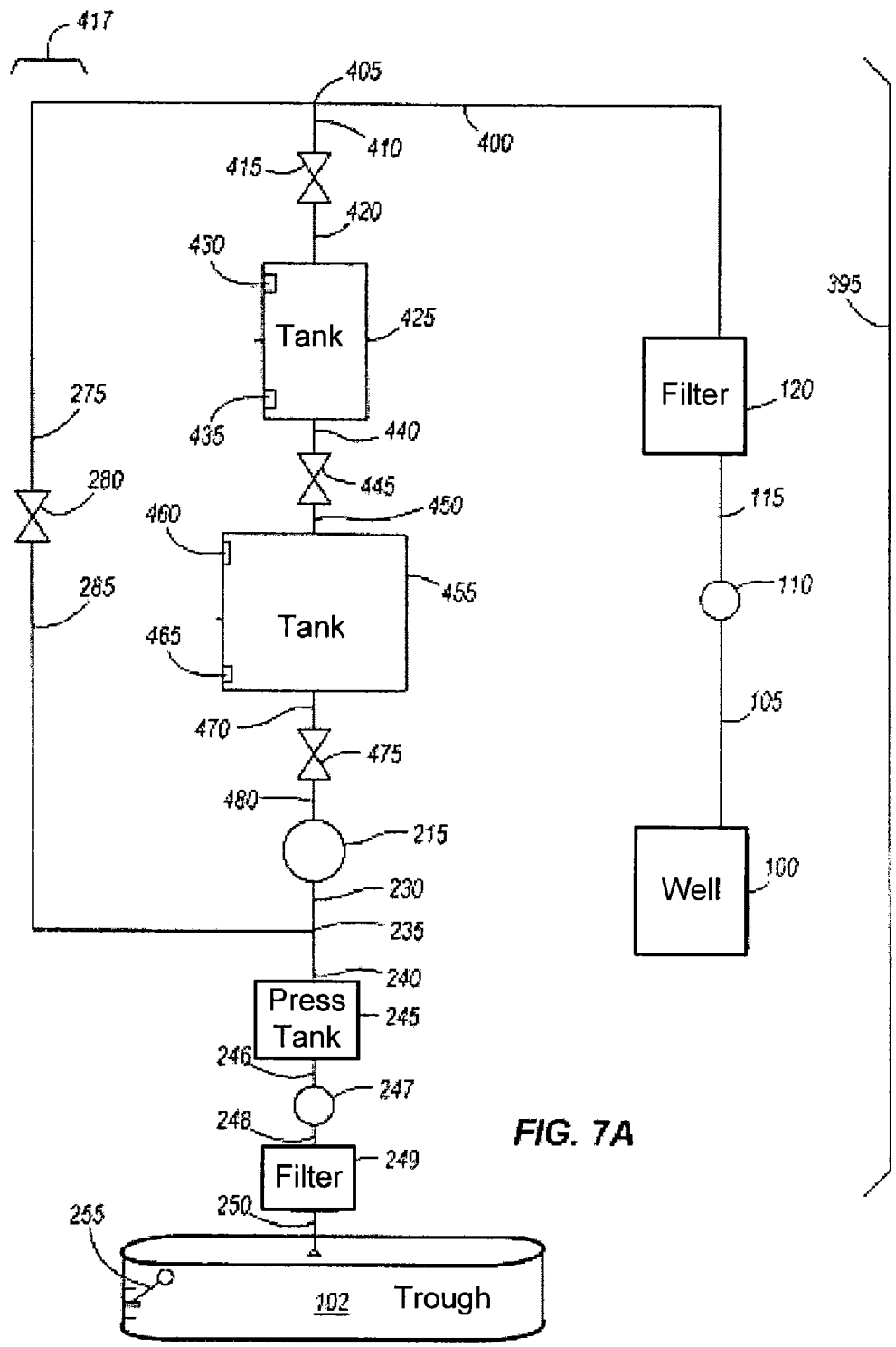
FIG. 7A is an exemplary illustration of a third embodiment of a water delivery system to reduce stray voltage.

FIG. 7A shows another embodiment of a water delivery system 395 that electrically isolates both the delivery containment devices and the water being supplied from one or more wells (referred to as well 100). The system includes well 100 and its associated devices, such as a pump and power supply for the pump (not shown). Well 100 delivers water through pipe 105 which is connected to a pressure switch 110. When pressure above a predetermined threshold is detected by pressure switch 110, the switch 110 opens an internal switch removing power to the pump of well 100.

Water exits pressure switch 110 through pipe 115 and enters filter 120. The filter removes certain contaminants such as sediment contained in the water. Water then flows through pipe 400 and into a Y-fitting or similar device 405 that divides the water into two paths. The first path flows into a pipe 410 which feeds a first valve 415. The second path flows into a manual bypass system 417.

When the first valve 415 is opened, water flows through pipe 420 into a first storage tank 425. A first sensor 430 detects when the water has reached a high level in the first storage tank 425. A second sensor 435 detects when water has reached a low level in the first storage tank 425. Water flows out of the first storage tank 425 via gravity through pipe 440 and into a second valve 445. When the second valve 445 is opened, water flows through pipe 450 into a second storage tank 455. A third sensor 460 detects when the water has reached a high level in the second storage tank 455. A fourth sensor 465 detects when water has reached a low level in the second storage tank 455. Water flows out of the second storage tank 455 via gravity through pipe 470 and into a third valve 475. In certain embodiments, the third valve 475 is air-actuated and constructed from non-conductive materials.

The booster pump 215 is fed from the third valve 475 via pipe 480. Water flows from the booster pump 215 though pipe 230. Pipe 230 connects to a Y-fitting or similar device 235 which feeds pipe 240. Pipe 240 is connected to pressure tank 245 which couples to a pipe 246. Pipe 246 feeds a low voltage pressure switch 247. When pressure above a predetermined threshold is detected by pressure switch 247, the pressure switch 247 opens an internal switch removing power to the booster pump 215. Water exits the pressure switch 247 through pipe 248 and enters filter 249. Filtered water leaves filter 249 via pipe 250 and flows into trough 102. As noted, the float switch 255 resides in trough 102 to indicate when the water level in trough 102 exceeds a predetermined depth.

Like the system 61, pipes in the water delivery system 395 are made of non-conductive materials and certain valves are non-electrically-actuated (e.g., air-actuated).

Figure 7B:
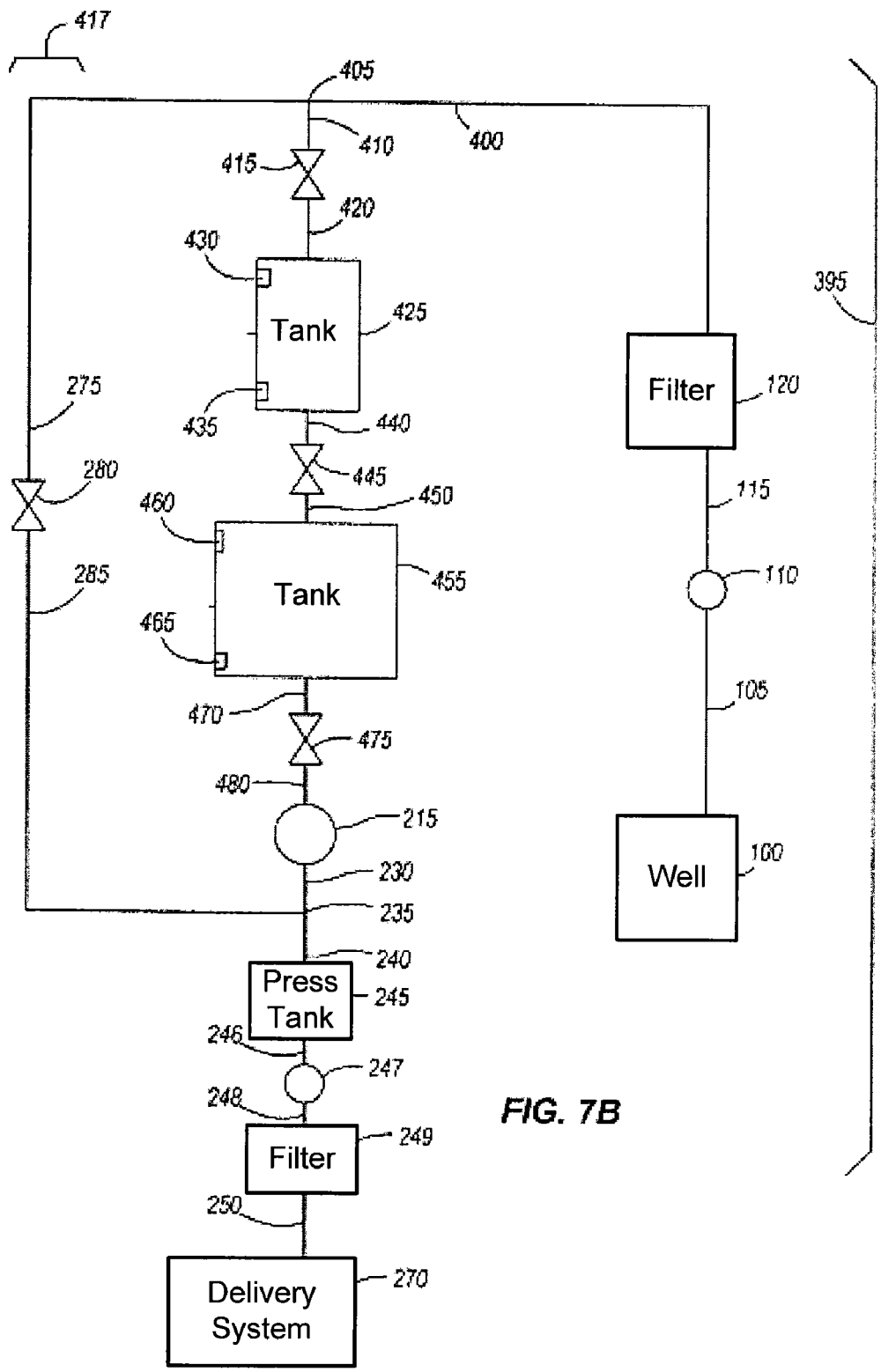
FIG. 7B is an exemplary illustration of a fourth embodiment of a water delivery system to reduce stray voltage.

An alternative embodiment of the water delivery system 395 is illustrated in FIG. 7B. The system is the same as that shown in FIG. 7A except that water flows from pipe 250 into a pressurized delivery system 270. The low-voltage pressure switch 247 detects when the water pressure in the pressurized delivery system 270 drops below a pre-determined threshold.

The manual bypass system 417 (FIGS. 7A and 7B) can be configured to supply water to the trough 102 or the pressurized delivery system 270 in the event the water system 395 is unable to do so. A pipe 275 receives water from Y-fitting 405 and is connected to a manually operated valve 280 which is constructed from non-conductive materials. Valve 280 is connected to pipe 285 which delivers water to Y-fitting 235 and the rest of the system. The use of non-conductive materials in valve 280 maintains the electrical isolation of the water system 61 when the valve 280 is closed.

A section of pipe 400 can be constructed of electrically conductive material (e.g., copper). In the presence of stray voltage on the well 100 system, measuring an electrical characteristic (e.g., voltage) between this conductive section of pipe 400 and ground reflects the level of stray voltage present. Additionally, a section of pipe 240 can be constructed of electrically conductive material (e.g., copper). If the system is operating correctly and electrical isolation between well 100 and the output of water system 395 is achieved, measuring an electrical characteristic (e.g., voltage) between this conductive section of pipe 240 and ground will indicate that stray voltage does not exist at this point in the water delivery system 395, even if such a characteristic exists between the conductive section of pipe 400 and ground.

Like certain other embodiments, certain valves used in the water distribution system 395 are non-electrically-actuated to further isolate the water delivery system 395 from the electrical distribution system. In addition, pipes used throughout the water delivery system 395 are made of non-conductive materials, such as plastics, ceramics, or other materials.

Operation of the System

In the embodiment shown if FIGS. 5A and 5B, electrical isolation of delivery system 61 is achieved, in part, by the use of non-conductive pipes. This creates an open circuit condition between well 100 and water trough 102 (or pressurized delivery system 270). In addition, utilization of air-actuated, relay-driven, low-voltage devices within the system reduces the possibility of introducing stray voltage from other sources. Electrical isolation of the water is achieved by preventing completion of an electrical circuit in water traveling from well 100 to water trough 102 (or pressurized delivery system 270). This is accomplished by ensuring that an open circuit condition (e.g., an air gap) exists in the water path between well 100 and the storage tank 165 or 170 that is supplying the water trough 102 (or pressurized delivery system 270). In addition, non-conductive air-actuated valves 200 and 210 act as electrical opens in the water circuit when they are closed, ensuring an electrical open exists in the circuit when the storage tanks are filling and an air gap does not otherwise exist in the water flowing through the system.

Figure 8:
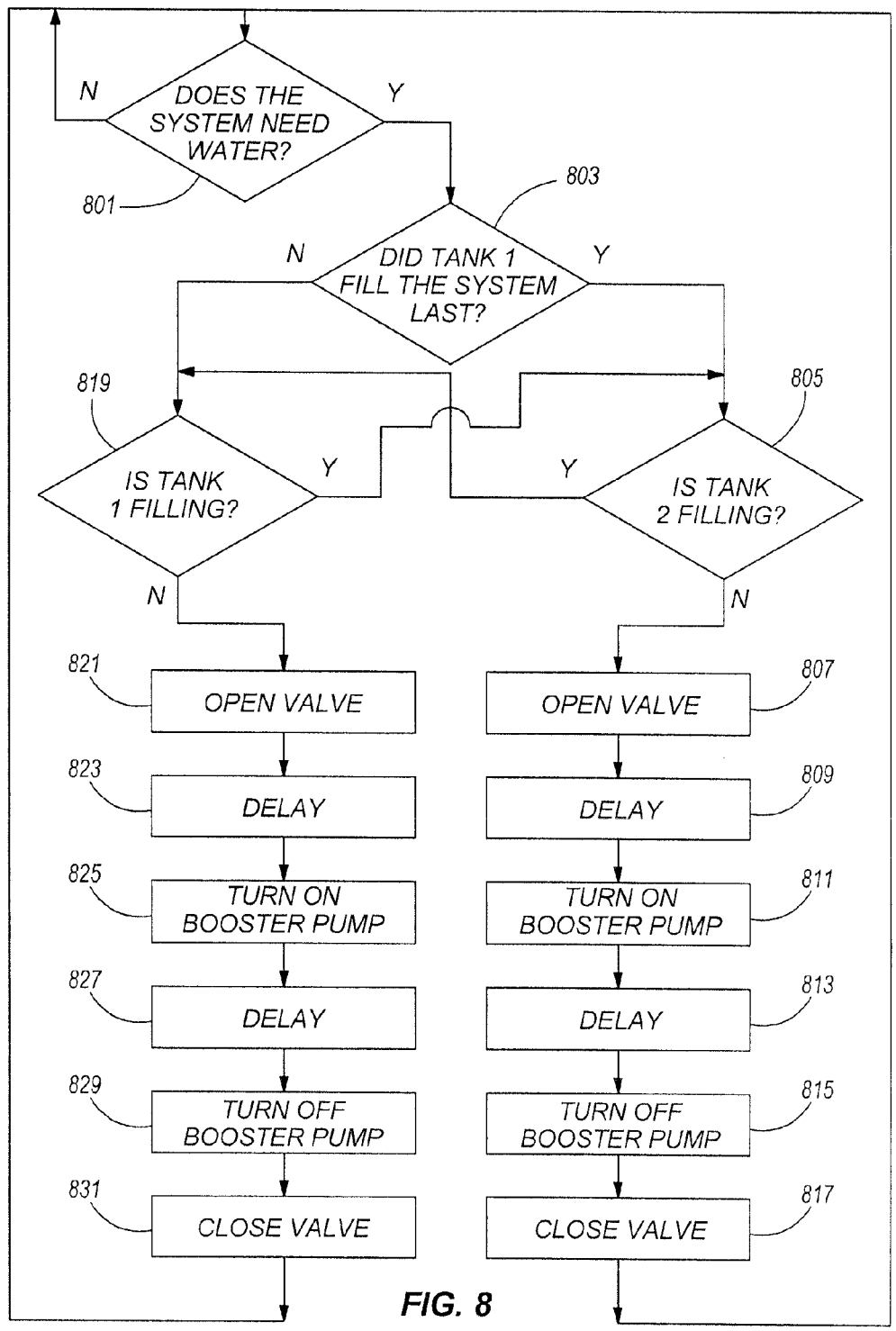
FIG. 8 is an illustration of a process to supply water using the water delivery system of FIGS. 5A and 5B.

FIG. 8 illustrates the process of sourcing water to trough 102 (or pressurized delivery system 270) in the water delivery system 61 shown in FIGS. 5A and 5B. The water level in trough 102 (or pressure in pressure delivery system 270) is checked at step 801 by PLC 300 by determining if float switch 255 (or pressure switch 247) is engaged. If float switch 255 (or pressure switch 247) is not engaged, the trough 102 (or pressurized delivery system 270) has sufficient water and the process loops back to step 801 to continue checking if the trough 102 (or pressurized delivery system 270) requires additional water. If, at step 801, float switch 255 (or pressure switch 247) is engaged, which indicates that the water level in trough 102 (or pressure in the pressurized delivery system 270) is low, the process of providing water to trough 102 (or pressurized delivery system 270) continues.

At step 803 a determination is made if the first storage tank 165 filled trough 102 (or pressurized delivery system 270) the previous time water was required. If the first storage tank 165 was used to fill trough 102 (or pressurized delivery system 270) the previous time water was required, an attempt to utilize the second storage tank 170 is made. At step 805 second storage tank 170 is checked to determine if it is being filled from well 100. If the second storage tank 170 is not being filled by well 100, the second storage tank 170 is chosen to fill trough 102 (or pressurized delivery system 270). Non-conductive air-actuated valve 210 is opened at step 807. To ensure that an open exists in the water path from well 100 through second storage tank 170, it is necessary to ensure that valve 160 is not open and residual water flow has ceased. A delay, at step 809, accomplishes this. Following the delay at step 809, booster pump 215 is energized at step 811. A predetermined delay to fill trough 102 (or pressurized delivery system 270) is executed at step 813. Once trough 102 (or pressurized delivery system 270) has been filled, booster pump 215 is de-energized at step 815 and valve 210 is closed. Processing continues at step 801 to wait for water in trough 102 (or pressure in pressurized delivery system 270) to reach a low level.

If it is determined that the second storage tank 170 was used to fill trough 102 (or pressurized delivery system 270) the previous time water was required or if the second storage tank 170 is being filled from well 100, it is determined whether the first storage tank 165 is being filled from well 100 at step 819. If the first storage tank 165 is being filled from well 100, processing continues at step 805. If both the first storage tank 165 and the second storage tank 170 are filling from well 100, the first one to finish filling is utilized to fill trough 102 (or pressurized delivery system 270).

If it is determined that the first storage tank 165 is not filling (step 819), the first storage tank 165 is used to fill trough 102 (or pressurized delivery system 270). Valve 200 is opened at step 821. To ensure that an open circuit condition exists in the water path from well 100 through the first storage tank 165, air-actuated valve 140 should be closed and any residual water flow should end. A delay (step 823) is used to ensure that sufficient time has passed to allow valve 140 to close and water flow to stop. Following the delay, booster pump 215 is energized at step 825. A predetermined delay to fill trough 102 (or pressurized delivery system 270) is executed at step 827. Once trough 102 (or pressurized delivery system 270) has been filled, booster pump 215 is de-energized at step 829 and valve 200 is closed. Processing continues at step 801 waiting for water in trough 102 (or pressurized delivery system 270) to reach a low level.

Figure 9:
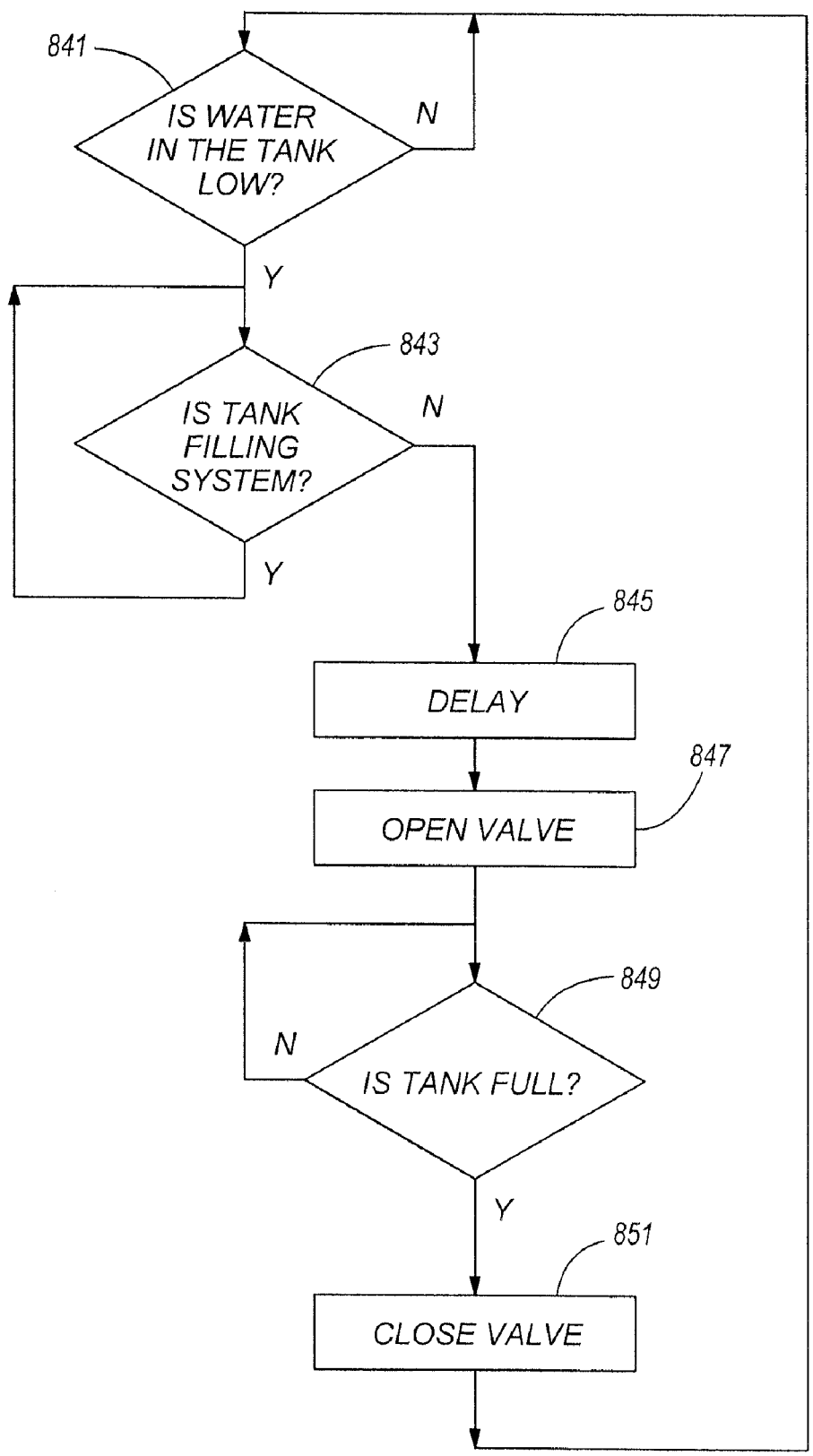
FIG. 9 is an illustration of a process for filling the storage tanks of FIGS. 5A and 5B.

FIG. 9 illustrates the process for filling storage tanks 165 and 170 when their water level reaches a low point. Sensor 180 is checked at step 841 to determine if the water level in the first storage tank 165 has reached a low level. If the water level in the first storage tank 165 is not low, the process loops back to step 841 to continue monitoring the water level.

If the sensor 180 indicates that the water level has reached a low level (step 841), it is determined at step 843 whether first storage tank 165 is filling trough 102 (or pressurized delivery system 270). If first storage tank 165 is filling trough 102 (or pressurized delivery system 270), it cannot be filled from well 100 without closing the electrical open in the water loop. Therefore, the process loops at step 843 until trough 102 (or pressurized delivery system 270) has finished filling.

Once the first storage tank 165 is finished filling trough 102 (or pressurized delivery system 270), processing continues at step 845 with a delay. This delay ensures an open circuit condition exists in the water loop by providing sufficient time for residual water flow to end. Once the delay is complete, air-actuated valve 140 is opened at step 847. Water flows into first storage tank 165 from well 100. Sensor 175 is monitored at step 849. Once water reaches a level sufficient for the sensor 175 to detect (step 849), valve 140 is closed (step 851). Processing continues at step 841 by monitoring sensor 180.

For the second storage tank 170, sensor 190 is checked at step 841 to determine if the water level in the second storage tank 170 has reached a low level. If the water level in the second storage tank 170 is not low, the process loops back to step 841 to continue monitoring the water level.

If the sensor 190 indicates that the water level has reached a low level (step 841), it is determined at step 843 whether second storage tank 170 is filling trough 102 (or pressurized delivery system 270). To maintain electrical isolation, storage tank 170 is not filled from the well 100 while the tank 170 is filling through 102 (or pressurized delivery system 270). Therefore, the process loops at step 843 until the trough 102 (or pressurized delivery system 270) has finished filling.

Once the second storage tank 170 is finished filling trough 102 (or pressurized delivery system 270), processing continues at step 845 with a delay. This delay ensures an electrical open exists in the water loop by allowing any residual water flow to end. Once the delay is complete, air-actuated valve 160 is opened at step 847. Water flows into second storage tank 170 from well 100. Sensor 185 is monitored at step 849. Once water reaches a level sufficient for the sensor 185 to detect (step 849), valve 160 is closed (step 851). Processing continues at step 841 by monitoring the sensor 190.

Figure 10:
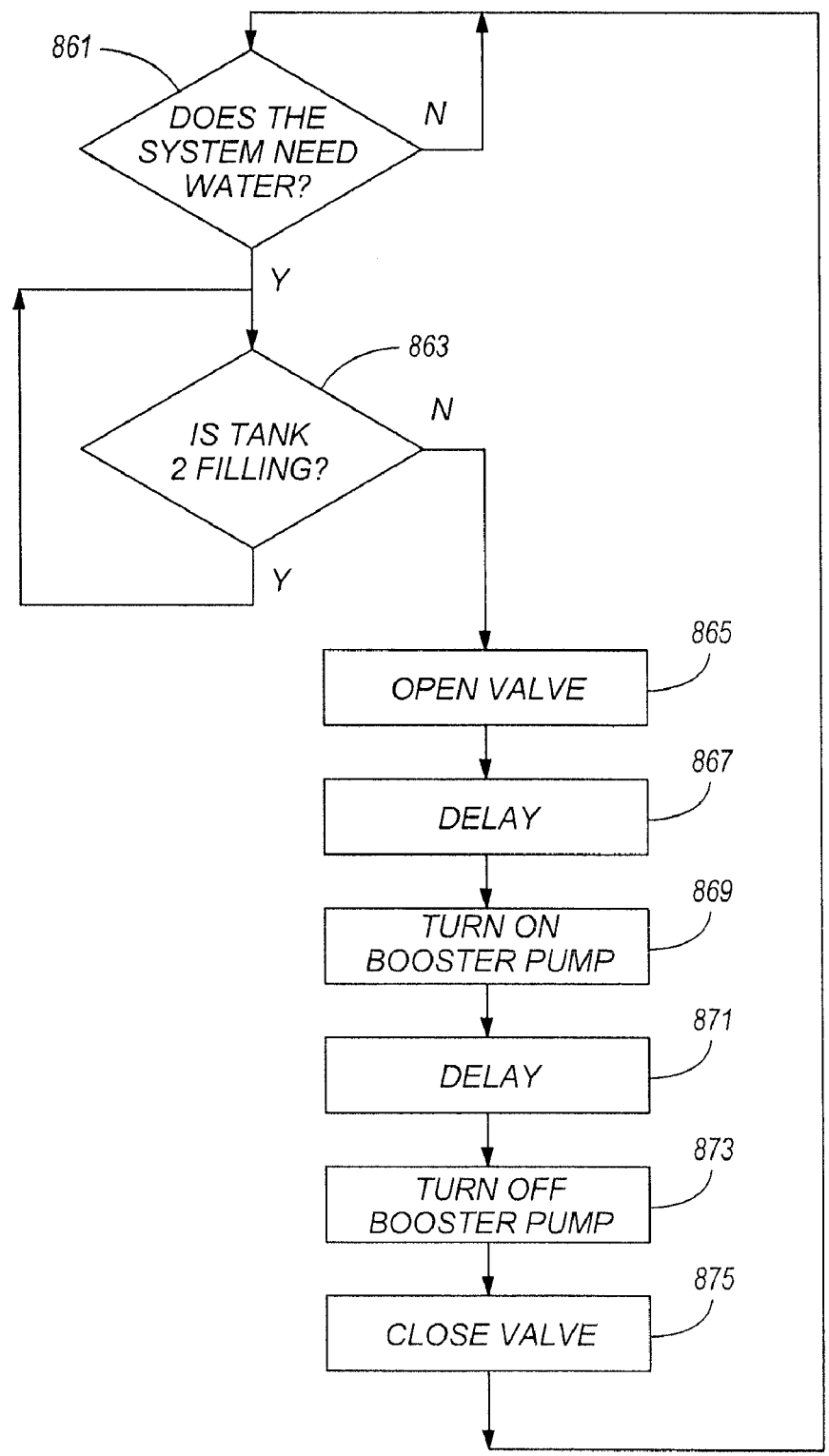
FIG. 10 is an illustration of a process to supply water using the water delivery system of FIGS. 7A and 7B.

FIG. 10 illustrates an embodiment of a process of sourcing water to trough 102 (or pressurized delivery system 270) in the water delivery system 395 shown in FIGS. 7A and 7B. The water level in trough 102 (or pressure in pressurized delivery system 270) is checked at step 861 by PLC 300 determining if float switch 255 (or pressure switch 247) is engaged. In alternative embodiments, the float switch 255 may be non-electrical. If float switch 255 (or pressure switch 247) is not engaged, trough 102 (or pressurized delivery system 270) has sufficient water and the process loops back to step 861 to continue checking if trough 102 (or pressurized delivery system 270) requires additional water. If, at step 861, the float switch 255 (or pressure switch 247) is engaged, which indicates that the water level in trough 102 (or pressure in pressurized delivery system 270) is low, the process of providing water to trough 102 (or pressurized delivery system 270) continues at step 863.

Second storage tank 455 is checked to determine if it is being filled from the first storage tank 425. If the first storage tank 425 is not filling second storage tank 455, the second storage tank 455 fills trough 102 (or pressurized delivery system 270). Valve 475 is opened at step 865. To ensure that an open circuit condition exists in the water path from well 100 through second storage tank 455, it is necessary to ensure that valve 445 is not open and residual water flow has ceased. A delay, at step 867, accomplishes this. Following the delay at step 867, booster pump 215 is energized at step 869. A predetermined delay to fill trough 102 (or pressurized delivery system 270) is executed at step 871. Once the trough 102 (or pressurized delivery system 270) has been filled, booster pump 215 is de-energized at step 873 and valve 475 is closed.

Processing continues at step 861 to wait for water in trough 102 (or pressure in pressurized delivery system 270) to reach a low level.

Figure 11:
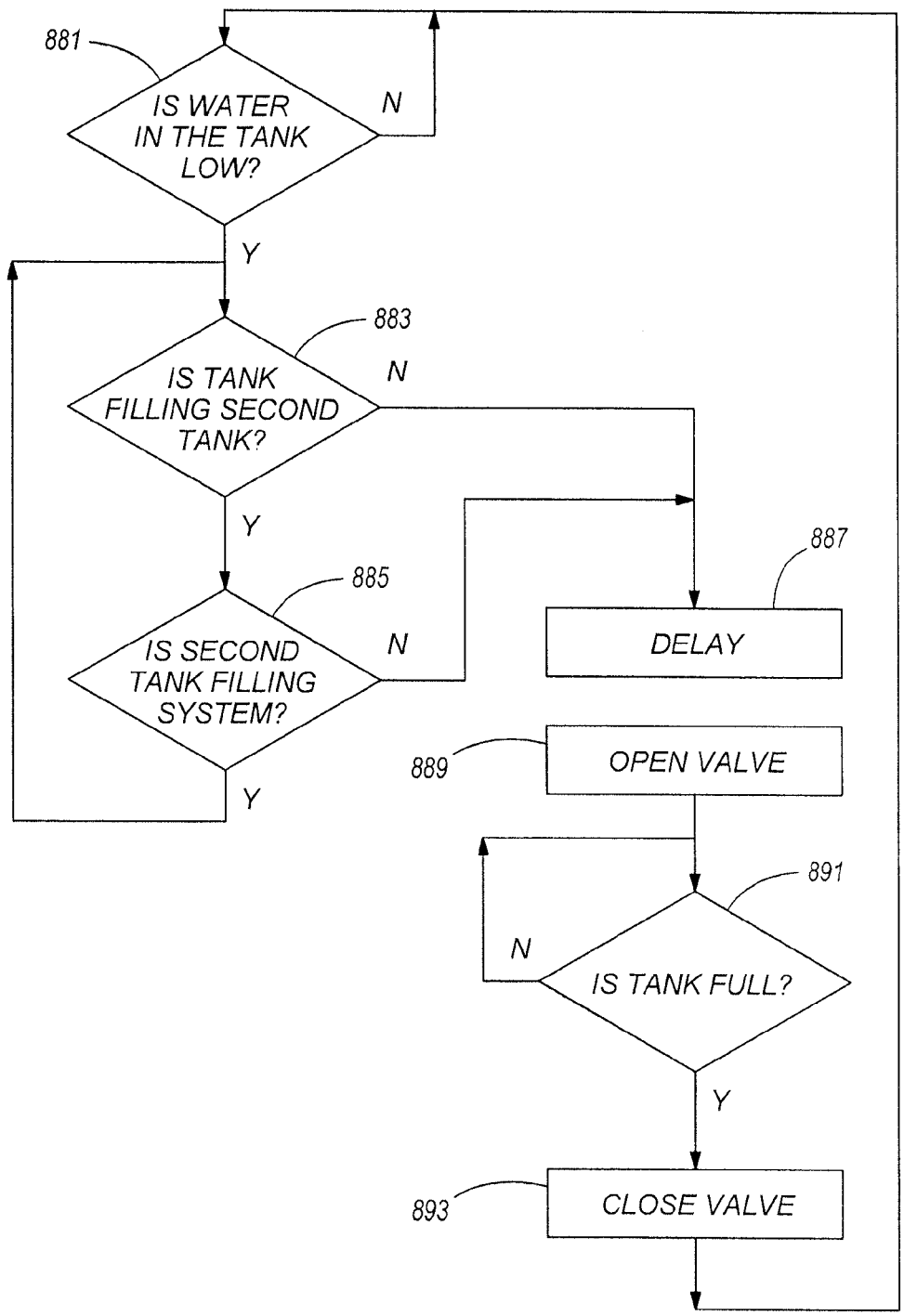
FIG. 11 is an illustration of a process for filling a storage tank of FIGS. 7A and 7B.

FIG. 11 illustrates the process for filling first storage tank 425 in the water delivery system 395 shown in FIGS. 7A and 7B. Sensor 435 is checked at step 881 to determine if the water level in first storage tank 425 has reached a low level. If the water level in first storage tank 425 is not low, the process loops back to step 881 to continue monitoring the water level.

If the sensor 435 indicates that the water level has reached a low level, it is determined at step 883 whether first storage tank 425 is filling the second storage tank 455. If first storage tank 425 is filling the second storage tank 455, it is determined at step 885 whether second storage tank 455 is filling trough 102 (or pressurized delivery system 270). If the first storage tank 425 is filling the second storage tank 455 and the second storage tank 455 is filling trough 102 (or pressurized delivery system 270), the first storage tank 425 cannot be filled from well 100 without closing the electrical open in the water loop. Therefore, the process loops back to step 883 until either the second storage tank 455 or the trough 102 (or pressurized delivery system 270) has finished filling.

Once the second storage tank 455 is not filling or trough 102 (or pressurized delivery system 270) is filled, processing continues at step 887 with a delay. This delay ensures an electrical open exists in the water loop by allowing any residual water flow to end. Once the delay is complete, air-actuated valve 415 is opened at step 889. Water then flows into first storage tank 425 from well 100. Sensor 430 is monitored at step 891. Once water reaches the high level, sensor 430 detects the water at step 891 and valve 415 is closed at step 893. Processing continues at step 881 by monitoring the sensor 435.

FIG. 9 illustrates the process for filling second storage tank 455 in the water delivery system 395 shown in FIGS. 7A and 7B. Sensor 465 is checked at step 841 to determine if the water level in second storage tank 455 has reached a low level. If the water level in second storage tank 455 is not low, the process loops back to step 841 to continue monitoring the water level.

If the sensor 465 indicates that the water level has reached a low level (step 841), it is determined at step 843 whether the second storage tank 455 is filling trough 102 (or pressurized delivery system 270). If the second storage tank 455 is filling trough 102 (or pressurized delivery system 270) it cannot be filled from well 100 without the possibility of closing the electrical open in the water loop. Therefore, the process loops at step 843 until the trough 102 (or pressurized delivery system 270) has finished filling.

Once trough 102 (or pressurized delivery system 270) is filled from the second storage tank 455, processing continues at step 845 with a delay. This delay ensures an electrical open exists in the water loop by allowing any residual water flow to end. Once the delay is complete, valve 445 is opened at step 847. Water then flows into second storage tank 455 from the first storage tank 425 via gravity. Sensor 460 is monitored at step 849. Once water reaches a high level, sensor 460 detects the water at step 849 and valve 445 is closed at step 851. Processing continues at step 841, monitoring the sensor 465.

Because of the way a well must be grounded to meet NEC regulations, wells and associated water delivery systems can be a major transmission mechanism of stray current on a farm or other facility, especially stray current generated by a utility. The embodiments of the water delivery system previously discussed electrically isolate the water delivery system from the well. In addition to stray current transmitted through grounds, water delivery systems are vulnerable to the introduction of stray current from on-site electrical systems such as electric motors. The links between the water delivery system and various locations at a facility make every location vulnerable to stray current introduced at another location. This stray current can impact animals drinking from the water delivery system in the same way stray current introduced at the well can. Therefore, there exists a need to isolate the animal drinking water from the rest of the water delivery system.

Figure 12:
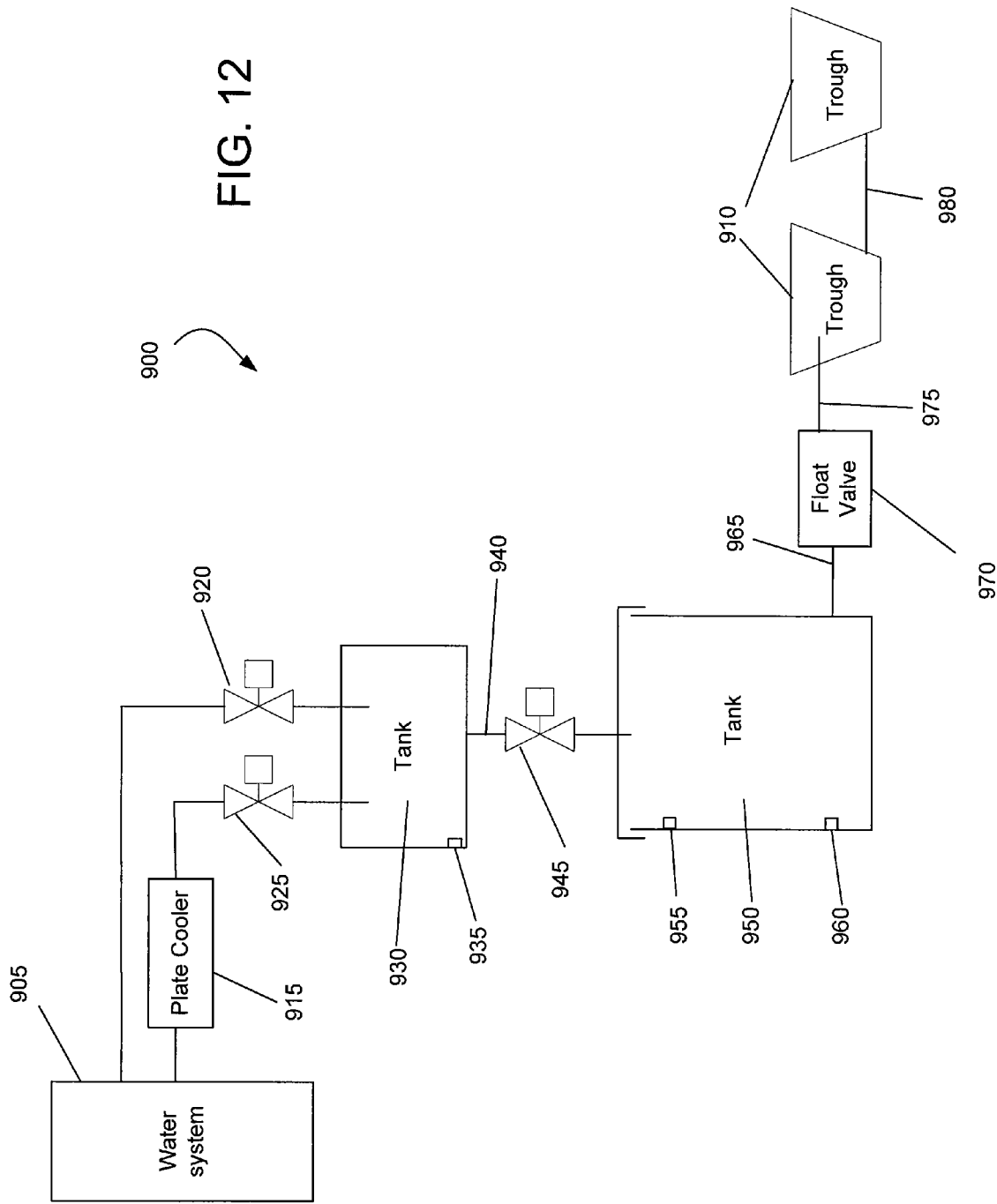
FIG. 12 is an exemplary illustration of an embodiment of a drinking water delivery system to isolate the drinking water from a water source.

FIG. 12 illustrates an embodiment of a drinking water delivery system 900 that electrically isolates drinking water from a water source 905, preventing stray current in the water source 905 from reaching the drinking water in one or more drinking tanks or troughs 910.

The water source 905 can be a pressurized delivery system, or a pump-driven system. In some embodiments, the water source 905 is linked directly to a well. In other embodiments, the water source 905 is an isolated water delivery system such as discussed previously. In the embodiment shown, the water source 905 provides water to a plate cooler 915 and to a first inlet valve 920 (in addition to other locations on the facility). Water flows through the plate cooler 915 and into a second inlet valve 925. The first and second inlet valves 920 and 925 supply the water to a top portion of a first non-conductive storage tank 930. In some embodiments, the first tank 930 includes a low-level sensor 935. An outlet pipe 940 in a lower portion of the first tank 930 allows water to flow out of the first tank 930 and into a liquid delivery control device such as a first outlet valve 945. The first outlet valve 945 supplies water, via gravity, to a top portion of a second non-conductive storage tank 950. In some embodiments, a pump can be used in place of the first outlet valve 945 as the liquid delivery control device. The pump can supply water to the second tank 950 when the second tank 950 is located at an elevation higher than an elevation of the first tank 930.

In the embodiment shown, the second tank 950 includes a high-level sensor 955 and a low-level sensor 960. A second outlet pipe 965, manufactured of non-conductive materials, is positioned in a lower portion of the second tank 950 and supplies water from the second tank 950 to a float valve 970. The float valve 970 is coupled, via a non-conductive pipe 975 to one or more drinking tanks or troughs 910. The float valve 970 opens when a level of the water in the troughs 910 drops below a predetermined level allowing water to flow into the troughs 910. In embodiments employing more than one trough 910, a non-conductive pipe 980 can couple the troughs 910 together and maintain a substantially equal level of water in each trough 910.

Figure 13:
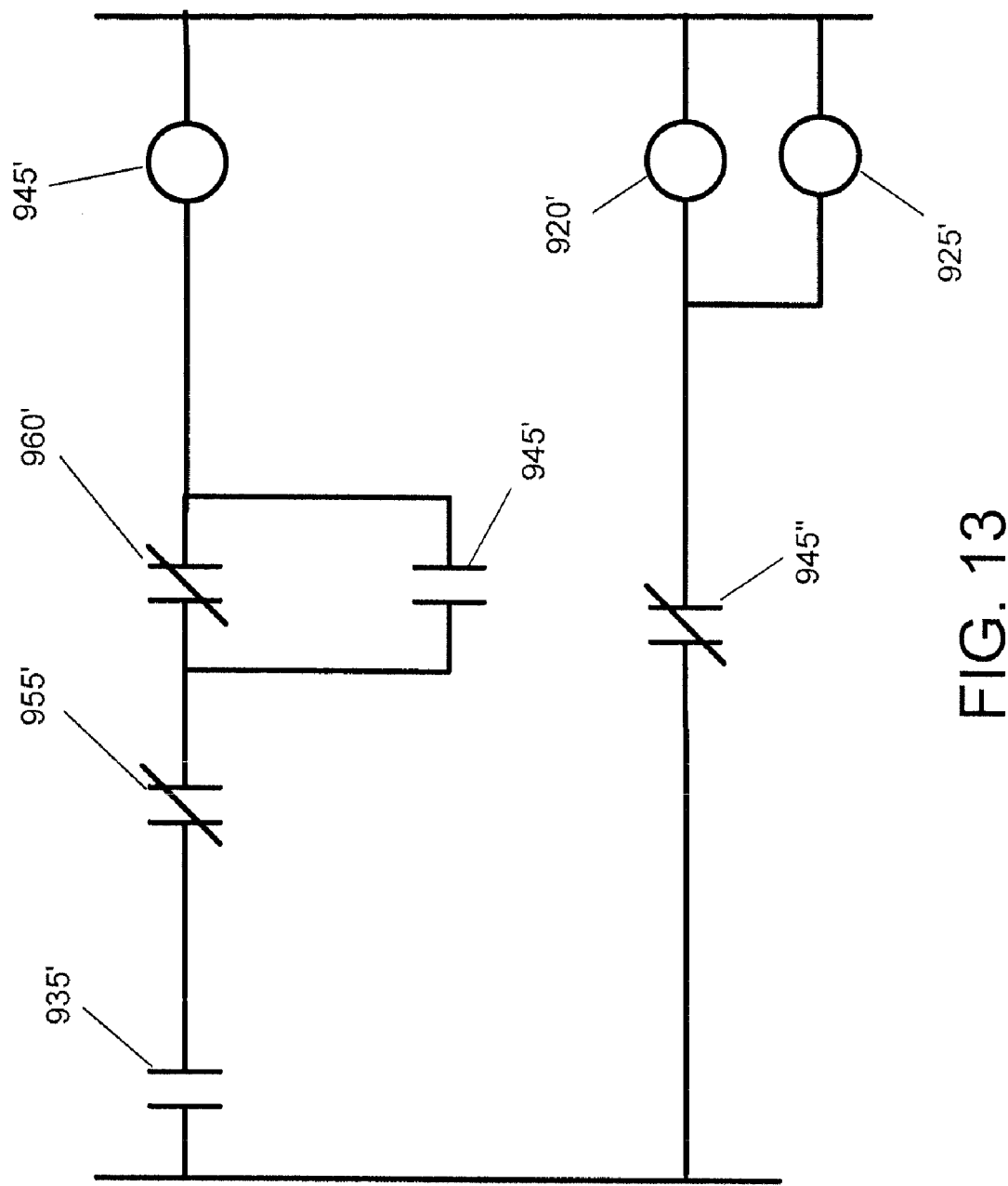
FIG. 13 is a ladder diagram representation of an embodiment of the operation of the drinking water delivery system of FIG. 12.

FIG. 13 illustrates a ladder diagram of an embodiment of the operation of the drinking water delivery system 900. Elements are numbered in the ladder diagram to correspond to their equivalents in FIG. 12. A normally open contact 935' is closed when the low-level sensor 935 detects a water level in the first tank 930 above a first predetermined level and is open when the low-level sensor 935 detects the water level in the first tank 930 below the first predetermined level. A normally closed contact 955' is closed when the high-level sensor 955 detects a water level in the second tank 950 below a second predetermined level and is open when the high-level sensor 955 detects a water level in the second tank 950 above the second predetermined level. A normally closed contact 960' is closed when the low-level sensor 960 detects a water level in the second tank 950 below a third predetermined level and is open when the low-level sensor 960 detects the water level in the second tank 950 above the third predetermined level. The third predetermined level is less than the second predetermined level.

A normally closed contact 960' is closed when the water level in the second tank 950 is below the third predetermined level. Normally closed contact 955' is also closed when the water level in the second tank 950 is below the third predetermined level indicating that the water level in the second tank 950 is below the second predetermined level. If the water level in the first tank 930 is above the first predetermined level, all three contacts 935', 955', and 960' are closed and power is provided to a coil 945' which opens the first outlet valve 945. Water flows from the first tank 930 into the second tank 950 when the first outlet valve 945 is open.

Normally closed contact 960' opens once the water level in the second tank 950 rises above the third predetermined level. A normally open contact 945' closes and a normally closed contact 945" opens when power is provided to coil 945'. Normally open contact 945' is wired in parallel around normally open contact 960' and provides a path for power to continue to be provided to coil 945' after normally closed contact 960' opens. Water continues to flow from the first tank 930 to the second tank 950 until either the water level in the first tank 930 drops below the first predetermined level or the water level in the second tank 950 rises above the second predetermined level. Normally open contact 935' opens when the water in the first tank 930 rises above the first predetermined level. Normally closed contact 955' opens when the water in the second tank 950 rises above the second predetermined level. Either one of these contacts opening removes power from coil 945' causing the first outlet valve 945 to close (stopping the flow of water from the first tank 930 to the second tank 950) and normally open contact 945' to open.

Power is removed from coils 920' and 925', closing the first inlet valve 920 and the second inlet valve 925, when normally closed contact 945" opens (i.e., power is provided to coil 945'). The flow of water from the water source 905 and the plate cooler 915 into the first tank 930 stops when the inlet valves 920 and 925 are closed.

In the embodiment shown, the low-level sensor 935 prevents a situation where the first outlet valve 945 is open and the first tank 930 runs out of water. Without the low-level sensor 935, the system 900 would remain in this state indefinitely. Other embodiments can prevent the system 900 from remaining in this state indefinitely including using a timer in place of the low-level sensor 935. The timer can remove power to the coil 945' following a period of time sufficient to fill the second tank 950 with water from the first tank 930.

The operation of the embodiment shown ensures that both the first and second inlet valves 920 and 925 are closed when the first outlet valve 945 is open. The first outlet valve 945 is closed when the first and second inlet valves 920 and 925 are open. Therefore, an air gap exists either between the first outlet valve 945 and the water in the second tank 950 or between the first and second inlet valves 920 and 925 and the water in the first tank 930. The existence of an air gap ensures that an electrical open exists between the water source 905 and the water in the second tank 950, and between the plate cooler 915 and the water in the second tank 950. Therefore, the water in the troughs 910 is isolated from the water source 905 and the plate cooler 915.

Figure 14:
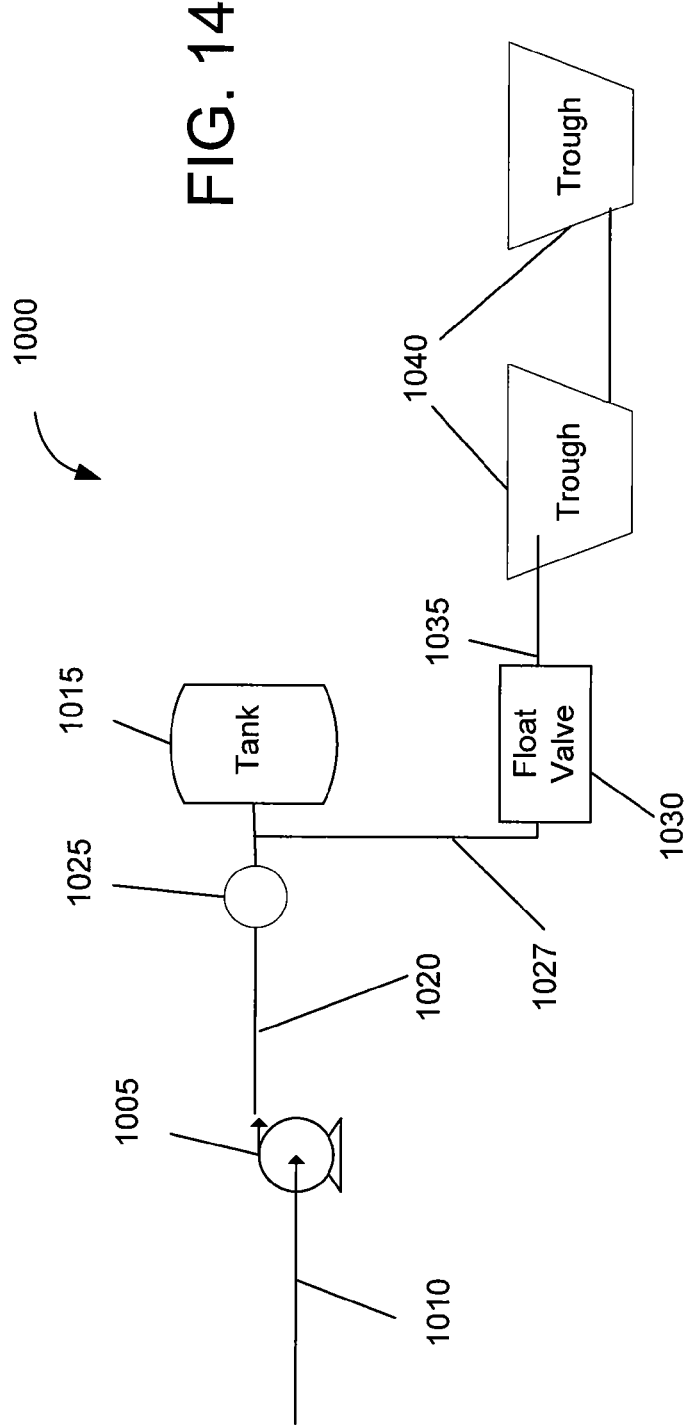
FIG. 14 is an exemplary illustration of another embodiment of the delivery system for the drinking water delivery system of FIG. 12.

FIG. 14 illustrates a delivery system 1000, which is an alternative to the drinking water delivery system 900. A pump driven, pressurized delivery system can be used in circumstances where a gravity fed delivery system, as shown in FIG. 12, is impractical (e.g., due to the elevation of the troughs).

A pump 1005 receives the water from the second tank 950 via a non-conductive pipe 1010. To prevent the pump 1005 from inducing stray current into the drinking water delivery system 900, the pump 1005 is electrically isolated from earth ground by mounting the pump 1005 on an insulated surface (e.g., wood) and not grounding the pump 1005.

The pump 1005 supplies water to a pressure tank 1015. A low-voltage electro-mechanical pressure switch 1025 monitors the pressure of the water in the pressure tank 1015 and a pipe 1020. The non-conductive pipe 1020 couples the pressure tank 1015 to a float valve 1030. The float valve 1030 is coupled, via a non-conductive pipe 1035 to one or more drinking tanks or troughs 1040. The float valve 1030 opens when a level of the water in the troughs 1040 drops below a predetermined level, allowing water to flow into the troughs 1040.

Figure 15:
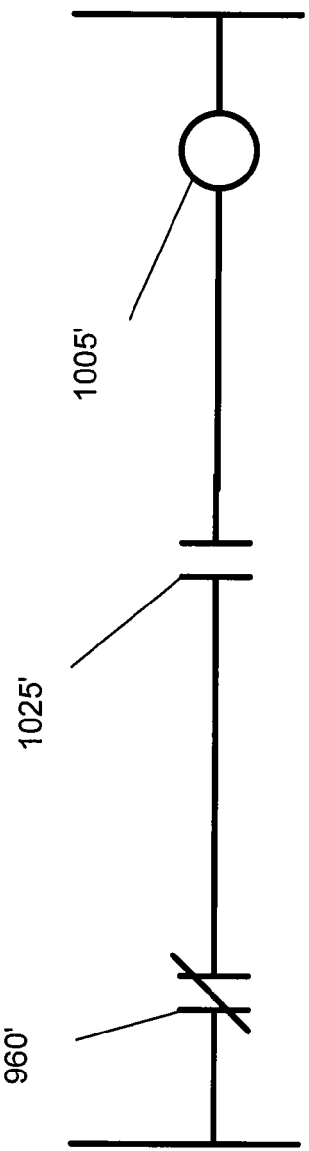
FIG. 15 is a ladder diagram representation of an embodiment of the operation of the delivery system of FIG. 14.

FIG. 15 illustrates an exemplary ladder diagram for controlling the pump driven pressurized delivery system 1000. A normally open contact 1025' closes when the pressure switch 1025 detects that a pressure in the pressure tank 1015 has dropped below a first threshold, supplying power to a coil 1005'. The pump 1005 is energized when coil 1005' receives power and supplies water to the pressure tank 1015. The pump 1005 continues to run until the pressure switch 1025 detects a pressure in the pressure tank 1015 above a second threshold, the second threshold greater than the first threshold. Since the water in the second tank 950 is electrically isolated from the water source 905 at all times by the air gaps previously discussed, the pump can run independent of the rest of the drinking water delivery system 900. The low-level sensor 960 detects if the water in the second tank 950 is below a predetermined level. A normally closed contact 960' opens when the low-level sensor 960 detects that the water level in the second tank 950 is below the third predetermined level removing power from the coil 1005' which deenergizes the pump 1005. This prevents the pump 1005 from being destroyed by running when there is no water in the second tank 950.

Figure 16:
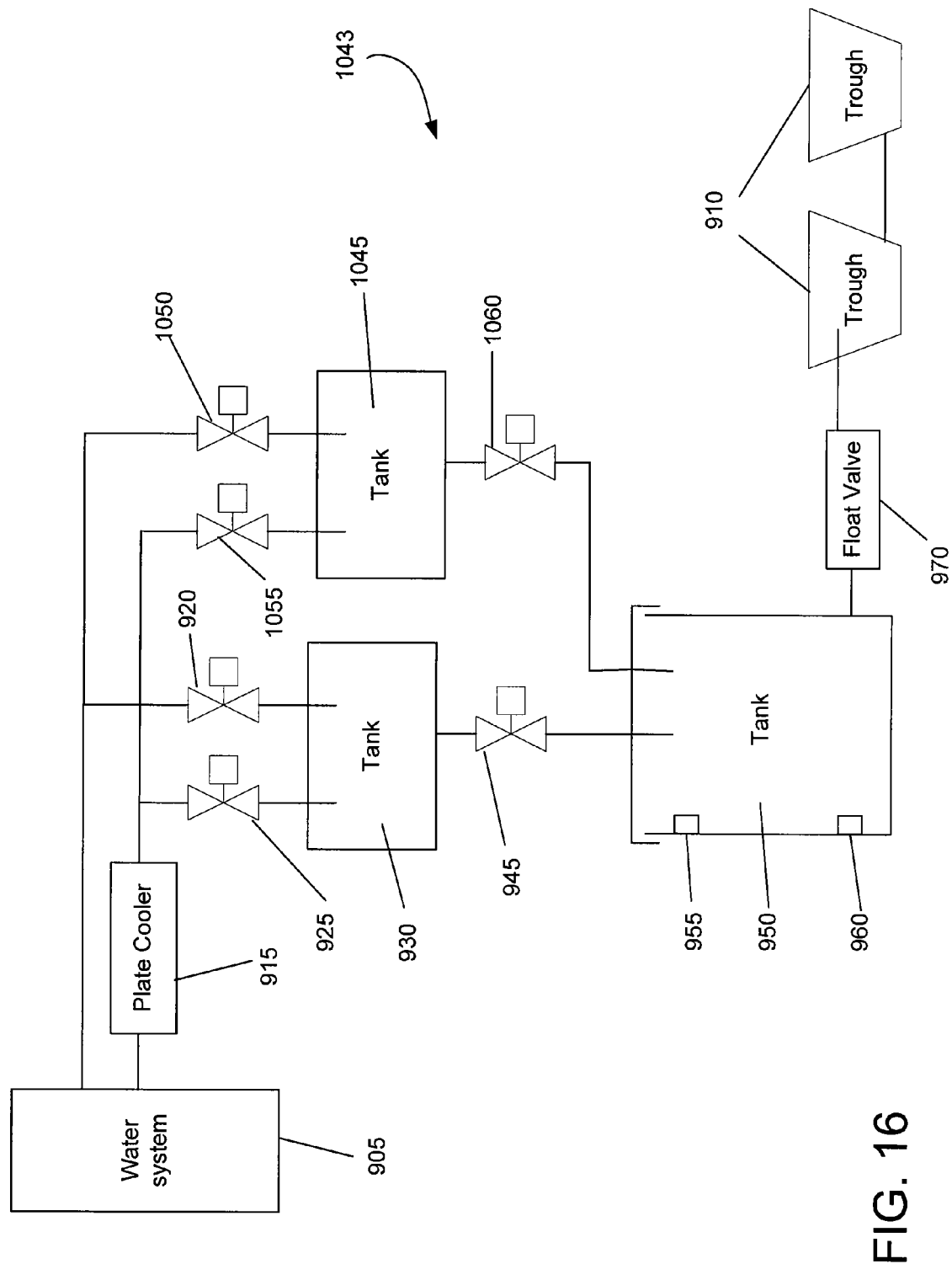
FIG. 16 is an exemplary illustration of another embodiment of a drinking water delivery system to isolate the drinking water from a water source.

In some high volume environments, the first tank 930 may be unable to fill the second tank 950 quickly enough to meet the drinking water needs of the facility or a flow of water from the plate cooler 915 cannot be stopped for a time period sufficient to allow filling of the second tank 950. FIG. 16 illustrates an embodiment of a drinking water delivery system 1043 designed to operate in such a high volume environment. In the embodiment shown, the drinking water delivery system 900 shown in FIG. 12 is modified by adding a third storage tank 1045, a third inlet valve 1050, a fourth inlet valve 1055, and a second outlet valve 1060.

The third non-conductive storage tank 1045 is supplied by the water source 905 and/or the plate cooler 915. The third inlet valve 1050 supplies water from the water source 905 and the fourth inlet valve 1055 supplies water from the plate cooler 915 to a top portion of the third tank 1045. The second outlet valve 1060 receives water from a bottom portion of the third tank 1045 and supplies the water to the top portion of the second tank 950.

Figure 17:
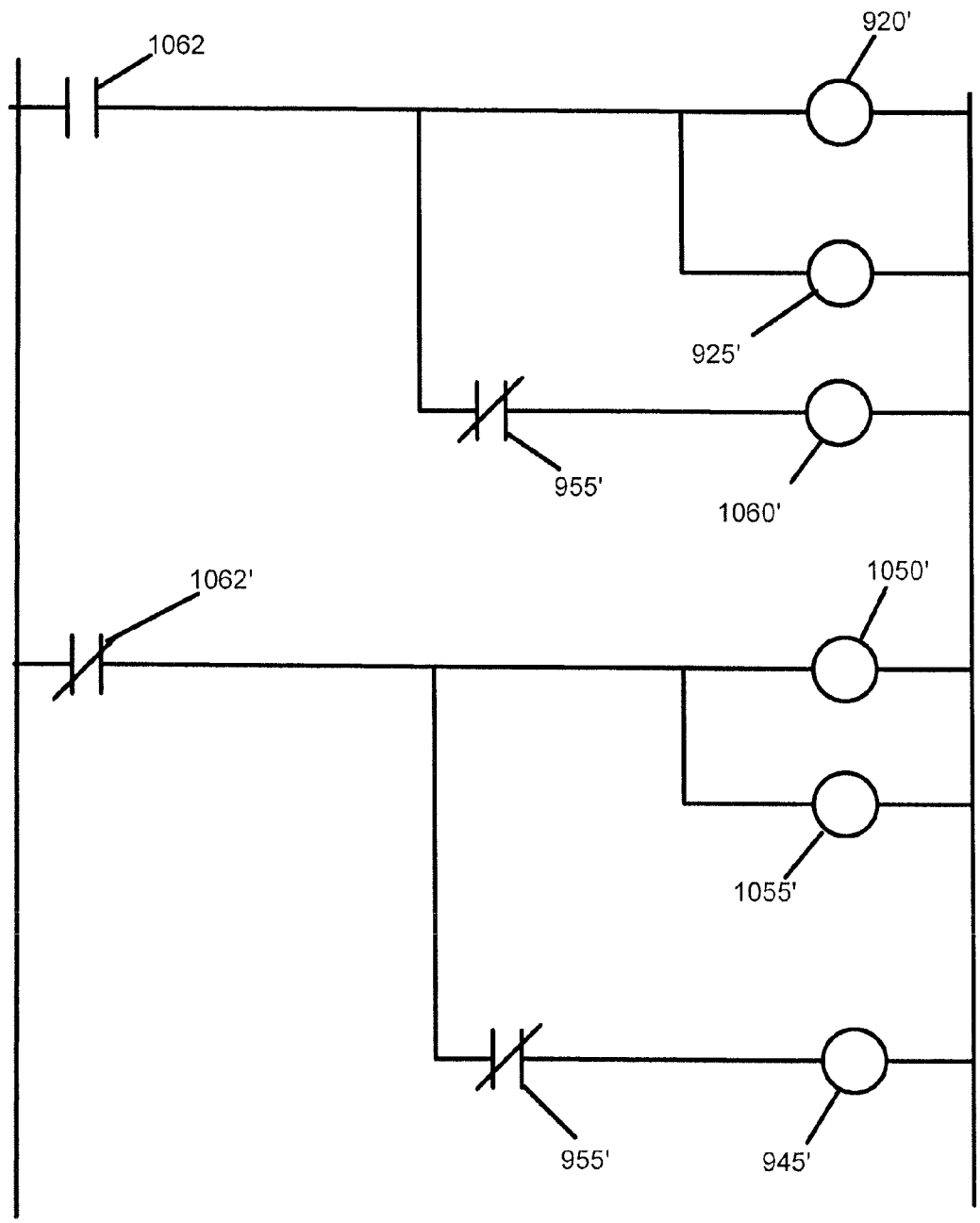
FIG. 17 is a ladder diagram representation of an embodiment of the operation of the drinking water delivery system of FIG. 16.

FIG. 17 illustrates a ladder diagram of an embodiment for operating the drinking water delivery system 1043 shown in FIG. 16. A timer 1062 having a 50% duty cycle (i.e., on 50% of the time and off 50% of the time) runs at a rate (e.g., one minute) that is less than the time it takes to fill the first tank 930 or the third tank 1045. The timer 1062 alternates the filling of the first tank 930 and the third tank 1045.

During a first half of the timer's duty cycle, a normally open contact 1062' is closed and a normally closed contact 1062" is open. When normally open contact 1062' is closed power is provided to coils 920' and 925' opening the first and second inlet valves 920 and 925. In addition, a normally closed contact 955' is in series with normally open contact 1062'. Normally closed contact 955' is closed when the water level in the second tank 950 is below a second predetermined level. If the normally closed contact 955' is closed, power is provided to coil 1060' which opens the second outlet valve 1060 allowing water to flow from the third tank 1045 into the second tank 950. If the water level in the second tank 950 rises above the second predetermined level, normally closed contact 955' opens and power is removed from the coil 1060' which closes the second outlet valve 1060.

Since normally closed contact 1062" is open, power is removed from coils 1050', 1055', and 945' closing the third and fourth inlet valves 1050 and 1055 and the first outlet valve 945.

During a second half of the timer's duty cycle, the normally open contact 1062' is open and the normally closed contact 1062" is closed. When normally open contact 1062' is open, power is removed from coils 920' and 925' and the first and second inlet valves 920 and 925 are closed. In addition, a normally closed contact 955' is in series with normally closed contact 1062". Normally closed contact 955' is closed when the water level in the second tank 950 is below a second predetermined level. If the normally closed contact 955' is closed, power is provided to coil 945' which opens the first outlet valve 945 allowing water to flow from the first tank 930 into the second tank 950. If the water level in the second tank 950 rises above the second predetermined level, normally closed contact 955' opens and power is removed from the coil 945' which closes the first outlet valve 945.

Since normally open contact 1062' is open, power is removed from coils 920', 925', and 1060' closing the first and second inlet valves 920 and 925 and the second outlet valve 1060.

When the first tank 930 is filling, the first outlet valve 945 is closed creating an air gap at the top of the second tank 950 and the second outlet valve 1060 is open filling the second tank 950. The third and fourth inlet valves 1050 and 1055 are closed creating an air gap at the top of the third tank 1045. Therefore, the combination of the air gap between the first tank 930 and the second tank 950 and between the water source 905 and the plate cooler 915 and the third tank 1045 electrically isolates the water in the second tank 950 from the water source 905 and the plate cooler 915. If the high-level sensor 955 in the second tank 950 opens, indicating that the water level in the second tank 950 has reached the high level, the first outlet valve 945 closes and no water is provided to the second tank 950.

When the third tank 1045 is filling, the second outlet valve 1060 is closed creating an air gap at the top of the second tank 950 and the first outlet valve 945 may be open and filling the second tank 950. The first and second inlet valves 920 and 925 are closed creating an air gap at the top of the first tank 930. If the high-level sensor 955 opens, indicating that the water level in the second tank 950 has reached the high level, the second outlet valve 1060 is closed and no water is provided to the second tank 950.

Alternative embodiments can rely on other methods of controlling the delivery of water to the second tank 950 and the creation of air gaps to provide electrical isolation. Some of these embodiments include, but are not limited to, level sensors in the first and third tanks 930 and 1045, providing only water from the plate cooler 915 to the third tank 1045, filling and emptying the first and third tanks 930 and 1045 simultaneously, using diverters (instead of inlet valves) to divert water into either the first tank 930 or the third tank 1045. It is critical that an air gap be maintained along each path of water from the water source 905 to the troughs 1040.

As discussed above, embodiments of the water delivery system can isolate the water delivery system from the well and, thus, the grounded secondary neutral, and the primary neutral, if it is jumpered. The water delivery system is, therefore, no longer a path for stray current from the neutrals of the electrical distribution system and is thus isolated from stray current caused by the utility.

Implementing the drinking water delivery systems 900 and 1043 helps isolate drinking water from the rest of the water system and prevent stray current in the water system from affecting animals when they drink. However, these systems add expense and do not prevent stray current on the farm from affecting the animals through other means such as milking equipment. Therefore, it is desirable to identify the sources of stray current at a facility and eliminate them.

Figure 18:
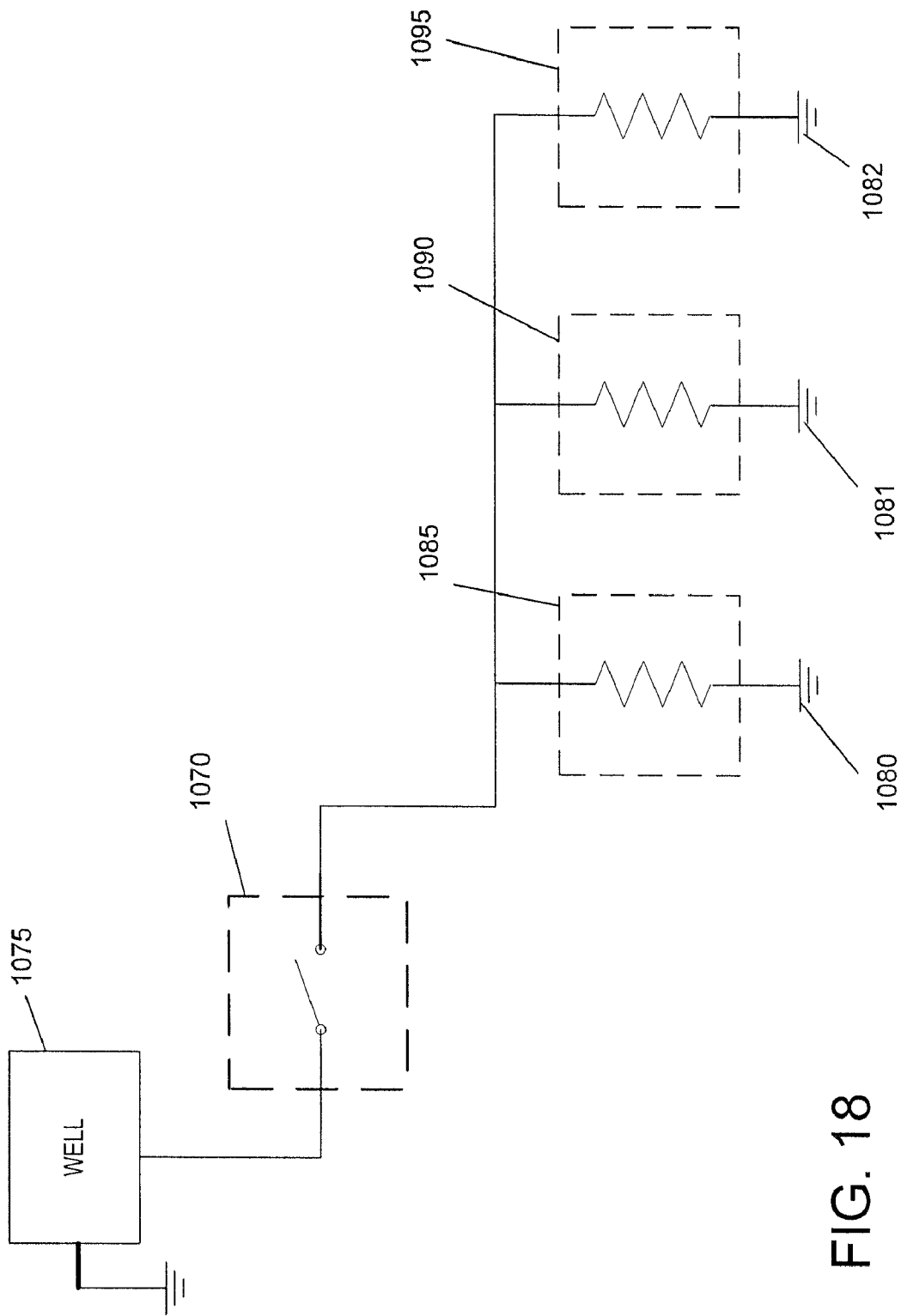
FIG. 18 is a schematic illustration of a possible electrical relationship between a water delivery system and a plurality of earth grounds.

FIG. 18 is a schematic illustration of a water system 1070 fed by a well 1075 and having a plurality of earth grounds 1080, 1081, and 1082. The water delivery system 1070 acts like a switch, opening the electrical connection between the water delivery system 1070 and the well 1075. The water system 1070 is electrically connected to each location of the facility or farm (e.g., milk house 1085, watering facility 1090, office 1095, etc.). Within each location, the water system 1070 may also be electrically connected to an earth ground. Depending on how the connection to earth ground is made, the impedance between the water system 1070 and the earth ground can vary from zero ohms to infinite ohms (an open connection). For example, in the case of the animal watering area, each time an animal drinks, the animal can provide a connection between the water system and an earth ground.

When a stray current is introduced to an earth ground, it divides along all the available paths to complete its circuit. Based on impedance levels, different levels of current will be present on the different paths to the circuit completion. According to Kirchoff's second law, the currents on all these different paths will all add up to the original stray current.

Figure 19:
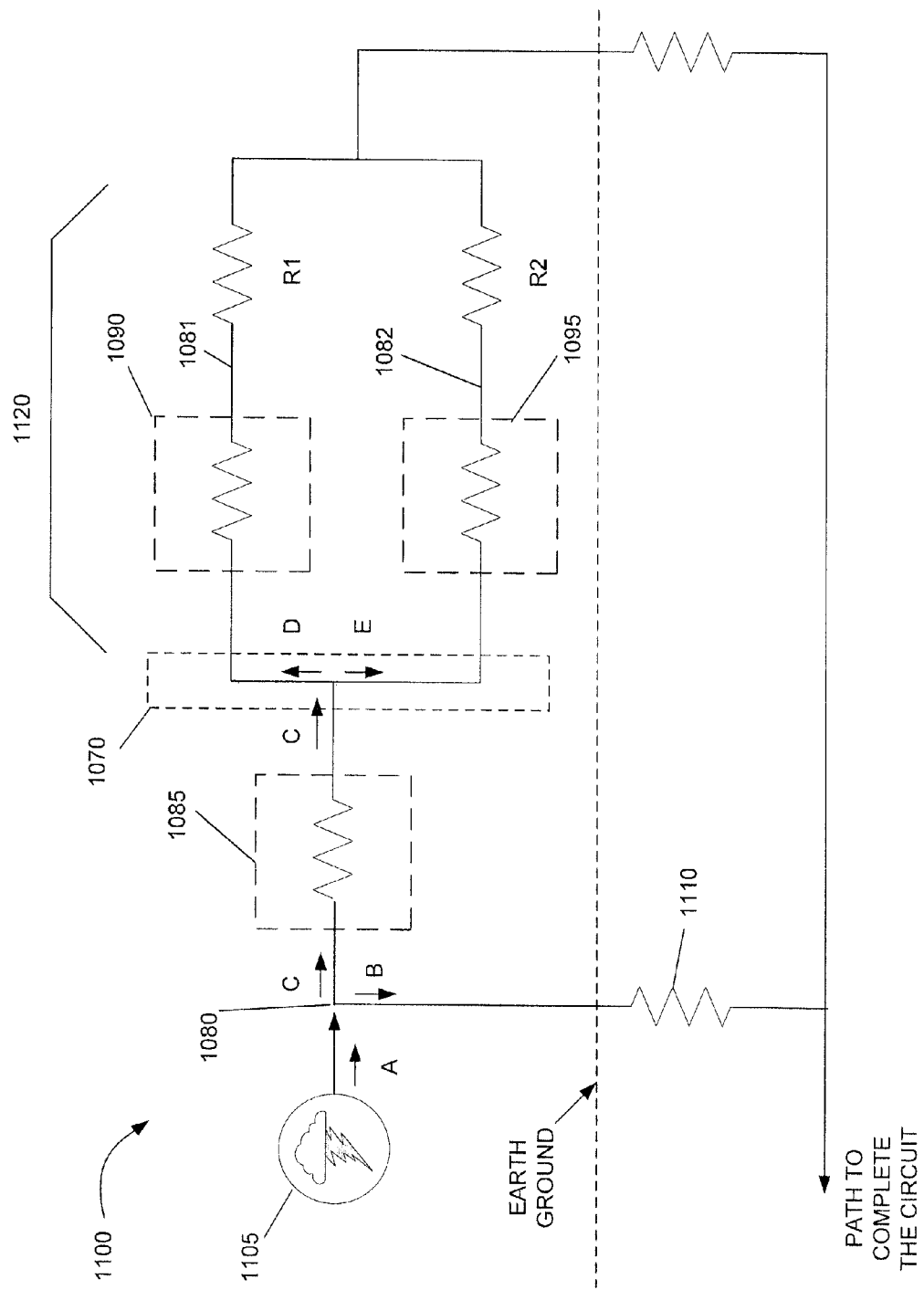
FIG. 19 is a schematic illustration of a possible stray current circuit.

FIG. 19 illustrates a simplified schematic diagram of an example of a possible stray current circuit 1100. For example, if a faulty pump in the milk house 1085 generates a stray current 1105 and introduces it to the earth ground 1080 at the milk house 1085, the stray current can take a number of paths back to complete its circuit. If there is a path to complete the circuit through the water system 1070, some of the stray current will pass through the water system 1070. The amount of stray current that passes through the water system 1070 depends on an impedance 1110 of the local earth ground to complete the circuit versus the impedance through the water system 1070 to complete the circuit. Based on Kirchoff's second law, the amount of current entering a node equals the amount of current leaving the node. Referring to FIG. 19, the stray current entering node 1080, represented by arrow A, is equal to the sum of the currents leaving the node 1080, represented by the arrow B entering earth ground and arrow C entering the water system 1070.

Current on path C passes through the impedance at the milk house 1085 and enters the water system 1070. A voltage between the water system 1070 and earth ground 1080 can be measured to detect the presence of stray current. The voltage level measured will be indicative of the amount of stray current in path C and the impedance at the milk house 1085.

The current in path C will again divide in the water system 1070 and enter parallel circuit 1120. The currents on paths D and E will add up to the current on path C. Because the voltage across a parallel circuit is the same for each path of the parallel circuit, the voltages measured between the water system 1070 and earth grounds 1081 and 1082 may be similar, depending on the impedance between the earth grounds 1081 and 1082 (represented by R1 and R2) and a point where they meet.

The impedance of the entire parallel circuit 1120 is less than the impedance of the lowest impedance path, D or E. Therefore, the voltage measured between the water system 1070 and the earth ground 1080 is greater than the voltage measured between the water system 1070 and any other earth ground as long as one path in the parallel circuit 1120 has an impedance less than the impedance of the milk house 1085.

FIG. 20 shows an embodiment of a monitoring system 1200 for monitoring a facility to identify a source of stray current. The monitoring system 1200 includes a plurality of meters 1205 monitoring an electrical characteristic between a test-point 1210 on an isolated water system 1070 (e.g., the electrically conductive section of pipe 240 in FIG. 5A) and a plurality of earth grounds 1080, 1081, and 1082 at different locations on the farm. Using the isolated water system 1070 as one of the test points helps provide cleaner signals that are segregated from the stray current caused by the utility and helps ease detecting and locating sources of stray current other than the utility.

In some embodiments, the system includes a computer 1215 linked to the plurality of meters 1205 for logging and processing the readings from the meters 1205. The computer 1215 can link to the plurality of meters 1205 in any suitable means available for communicating the measurements taken by the meters 1205 including a direct connection (e.g., serial communications and universal serial bus) and a networked connection. The computer 1215 can communicate with a printer 1217 to print reports and logs.

The plurality of meters 1205 can monitor a variety of electrical characteristics including alternating current volts ("$V_{AC}$"), direct current volts ("$V_{DC}$"), root mean square volts ("$V_{RMS}$"), peak-to-peak volts ("$V_{P-P}$"), and $V_{AC}$ plus $V_{DC}$. In some embodiments $V_{P-P}$ is monitored since $V_{P-P}$ can include all of the voltage components of the stray current including harmonics.

In some embodiments, the monitoring system 1200 logs the voltages detected at each location and displays a chart showing the voltage levels over a period of time. An operator can view the charts. A rise in voltage level is indicative of the presence of a stray current. The operator can then compare the voltages detected at each location at the time the event occurred, with the location displaying the largest voltage being the most likely point where the stray current was introduced. Next, the operator can determine if similar events have occurred and can analyze, based on the times and durations of the events, what on-site operations coincide with the events. This analysis can help to isolate the possible sources of the stray current. For example, if a set of events appear to originate in a milk house and they coincide with the filling of a dairy truck, the equipment involved with filling the dairy truck is a likely source of the stray current.

In some embodiments, the monitoring system 1200 includes software that monitors the detected voltages and provides an indication that an event has occurred. Indications the monitoring system 1200 provides include an alarm 1220, automatically sending an email describing the event, and printing an event log. The monitoring system 1200 also performs analysis on the logged data. The analysis provides a report of events that have similar characteristics (e.g., the timing, the wave form of the event, etc.) along with one or more probable locations of the introduction of the stray current and possible causes (e.g., equipment known to exist at the locations) of the stray current event.

In some embodiments, the monitoring system 1200 is linked to a wide area network 1225 such as the Internet. When the monitoring system 1200 network is enabled, a remote operator 1230 can monitor activity and view logs and reports.

In addition, the monitoring system 1200 can automatically provide alarms and reports to remote locations via the network.

In some embodiments, the meters 1205 are coupled to a plotter for recording the measurements taken by the meters 1205.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible. As should also be apparent to one of ordinary skill in the art, some systems and components shown in the figures are models of actual systems and components. Some control components described are capable of being implemented in software executed by a microprocessor or a similar device or of being implemented in hardware using a variety of components including, for example, timers and relays. In addition, terms like "processor" or "controller" may include or refer to both hardware and/or software.

Various features and advantages of the invention are set forth in the following claims.

What is claimed is:

1. A system for detecting and locating a source of unwanted electrical events, the system comprising:
    a water delivery system electrically isolated from an electrical transmission system of an electric utility and earth ground;
    a first test-point electrically connected to the water delivery system and electrically connected to a plurality of locations, the plurality of locations electrically isolated from the electrical transmission system and earth ground;
    a plurality of second test-points, each of the second test points located at earth grounds and proximate to one of the plurality of locations;
    at least one meter, the at least one meter configured to measure an electrical characteristic between the first test-point and one of the second test-points; and
    a recording device configured to receive and record the measured electrical characteristic from the at least one meter.

2. The system of claim 1 wherein the recording device includes a computer.

3. The system of claim 2 wherein the computer is configured to display the measured electrical characteristic graphically.

4. The system of claim 2 wherein the computer monitors the measured electrical characteristic and determines an event has occurred when the electrical characteristic exceeds a threshold.

5. The system of claim 4 wherein the computer provides an indication that an event has occurred, the indication being at least one of printing a report, sounding an alarm, and sending an email.

6. The system of claim 2 wherein the computer analyzes the measured electrical characteristic and identifies commonality between events.

7. The system of claim 2 wherein the electrical characteristic is at least one of alternating current volts, direct current volts, root mean square volts, peak-to-peak volts, and alternating current volts plus direct current volts.

* * * * *